United States Patent
Koito et al.

(10) Patent No.: US 10,599,246 B2
(45) Date of Patent: Mar. 24, 2020

(54) DISPLAY DEVICE WITH TOUCH DETECTING FUNCTION AND ELECTRONIC APPARATUS

(71) Applicant: Japan Display Inc., Tokyo (JP)

(72) Inventors: Takeo Koito, Tokyo (JP); Koji Ishizaki, Tokyo (JP); Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/289,158

(22) Filed: Feb. 28, 2019

(65) Prior Publication Data

US 2019/0196637 A1      Jun. 27, 2019

Related U.S. Application Data

(63) Continuation of application No. 16/045,173, filed on Jul. 25, 2018, now Pat. No. 10,254,869, which is a (Continued)

(30) Foreign Application Priority Data

Mar. 27, 2013   (JP) ................. 2013-067627

(51) Int. Cl.
  *G06F 3/041*   (2006.01)
  *G06F 3/044*   (2006.01)
  *G02F 1/1333*  (2006.01)

(52) U.S. Cl.
  CPC ........ *G06F 3/0412* (2013.01); *G02F 1/13338* (2013.01); *G06F 3/044* (2013.01); *G06F 2203/04112* (2013.01)

(58) Field of Classification Search
  None
  See application file for complete search history.

(56) References Cited

U.S. PATENT DOCUMENTS

2009/0213090 A1   8/2009  Mamba et al.
2011/0102361 A1   5/2011  Philipp
(Continued)

FOREIGN PATENT DOCUMENTS

CN    201654751    11/2010
CN    102053751     5/2011
(Continued)

OTHER PUBLICATIONS

Notice of Rejection issued in connection with Japanese Patent Application 2013-067627, dated Aug. 18, 2015. (7 pages).
(Continued)

*Primary Examiner* — Gustavo Polo
(74) *Attorney, Agent, or Firm* — K&L Gates LLP

(57) ABSTRACT

According to an aspect, a display device with a touch detecting function includes: a substrate; a display area; a touch detection electrode provided with a plurality of conductive thin wires, each of the conductive thin wires including a plurality of thin wire pieces each having a linear shape and including a first end and a second end; a drive electrode; and a display functional layer. The adjacent thin wire pieces are arranged so as to be bent at a bent portion serving as a portion at which the second end of the one thin wire piece of the adjacent thin wire pieces is connected to the first end of the other thin wire piece of the adjacent thin wire pieces, and the conductive thin wires include a bent portion having an angle formed by the adjacent thin wire pieces different from angles of the other bent portions.

19 Claims, 25 Drawing Sheets

Related U.S. Application Data continuation of application No. 15/928,508, filed on Mar. 22, 2018, now Pat. No. 10,061,422, which is a continuation of application No. 15/209,274, filed on Jul. 13, 2016, now Pat. No. 9,946,385, which is a continuation of application No. 14/220,943, filed on Mar. 20, 2014, now Pat. No. 9,471,165.

(56) References Cited

U.S. PATENT DOCUMENTS

| | | |
|---|---|---|
| 2011/0102370 A1 | 5/2011 | Kono et al. |
| 2011/0291966 A1 | 12/2011 | Takao et al. |
| 2011/0304601 A1 | 12/2011 | Niioka et al. |
| 2012/0019450 A1 | 1/2012 | Huang et al. |
| 2012/0153970 A1 | 6/2012 | Mignard et al. |
| 2012/0242606 A1 | 9/2012 | Mackey |
| 2012/0262382 A1 | 10/2012 | Guard et al. |
| 2012/0262412 A1 | 10/2012 | Guard |
| 2013/0050105 A1 | 2/2013 | Lee et al. |
| 2013/0063371 A1 | 3/2013 | Lee et al. |
| 2014/0060901 A1 | 3/2014 | Kim |

FOREIGN PATENT DOCUMENTS

| | | |
|---|---|---|
| CN | 102112949 | 6/2011 |
| CN | 102206046 | 10/2011 |
| CN | 102279494 | 12/2011 |
| CN | 102750029 | 10/2012 |
| JP | 2010-197576 | 9/2010 |
| JP | 2012-163951 | 8/2012 |
| KR | 1020110109817 | 10/2011 |
| KR | 1020130027747 | 3/2013 |
| TW | 201205378 | 2/2012 |
| TW | 201237722 | 9/2012 |
| WO | 2012/099150 | 7/2012 |

OTHER PUBLICATIONS

Taiwan Office Action dated Jul. 27,2015 in corresponding Taiwan Application No. 103110912.
Notice of Preliminary Rejection issued in connection with Korean Patent Application 10-2014-0033447, dated Jun. 30, 2015. (7 pages).
Chinese Office Action (with English translation) dated Jun. 23, 2016 in corresponding Chinese application No. 2014101140377 (26 pages).
Chinese Office Action dated May 27, 2019 in corresponding Chinese Application No. 201710251023.3.

FIG.17

| EVALUATION EXAMPLE | FIRST END | TARGET POSITION | x | y | ANGLE WITH RESPECT TO PIXEL ARRAY DIRECTION | MOIRE EVALUATION |
|---|---|---|---|---|---|---|
| EVALUATION EXAMPLE 1 | P00 | P01 | 0 | 1 | 0.00 | D |
| EVALUATION EXAMPLE 2 | P00 | P15 | 1 | 5 | 11.31 | D |
| EVALUATION EXAMPLE 3 | P00 | P14 | 1 | 4 | 14.04 | D |
| EVALUATION EXAMPLE 4 | P00 | P13 | 1 | 3 | 18.43 | D |
| EVALUATION EXAMPLE 5 | P00 | P12 | 1 | 2 | 26.57 | D |
| EVALUATION EXAMPLE 6 | P00 | P35 | 3 | 5 | 30.96 | B |
| EVALUATION EXAMPLE 7 | P00 | P23 | 2 | 3 | 33.69 | C |
| EVALUATION EXAMPLE 8 | P00 | P34 | 3 | 4 | 36.87 | A |
| EVALUATION EXAMPLE 9 | P00 | P45 | 4 | 5 | 38.66 | A |
| EVALUATION EXAMPLE 10 | P00 | P56 | 5 | 6 | 39.81 | A |
| EVALUATION EXAMPLE 11 | P00 | P11 | 1 | 1 | 45.00 | D |
| EVALUATION EXAMPLE 12 | P00 | P65 | 6 | 5 | 50.19 | A |
| EVALUATION EXAMPLE 13 | P00 | P54 | 5 | 4 | 51.34 | A |
| EVALUATION EXAMPLE 14 | P00 | P43 | 4 | 3 | 53.13 | A |
| EVALUATION EXAMPLE 15 | P00 | P32 | 3 | 2 | 56.31 | C |
| EVALUATION EXAMPLE 16 | P00 | P53 | 5 | 3 | 59.04 | B |
| EVALUATION EXAMPLE 17 | P00 | P21 | 2 | 1 | 63.43 | D |
| EVALUATION EXAMPLE 18 | P00 | P31 | 3 | 1 | 71.57 | D |
| EVALUATION EXAMPLE 19 | P00 | P41 | 4 | 1 | 75.96 | D |
| EVALUATION EXAMPLE 20 | P00 | P51 | 5 | 1 | 78.69 | D |
| EVALUATION EXAMPLE 21 | P00 | P10 | 1 | 0 | 90.00 | D |

FIG.19

| EVALUATION EXAMPLE | FIRST END | TARGET POSITION | x | y | ANGLE WITH RESPECT TO PIXEL ARRAY DIRECTION | MOIRE EVALUATION |
|---|---|---|---|---|---|---|
| EVALUATION EXAMPLE 22 | Q00 | Q01 | 0 | 1 | 0.00 | D |
| EVALUATION EXAMPLE 23 | Q00 | Q15 | 1 | 5 | 14.93 | D |
| EVALUATION EXAMPLE 24 | Q00 | Q14 | 1 | 4 | 18.43 | D |
| EVALUATION EXAMPLE 25 | Q00 | Q13 | 1 | 3 | 23.96 | D |
| EVALUATION EXAMPLE 26 | Q00 | Q12 | 1 | 2 | 33.69 | D |
| EVALUATION EXAMPLE 27 | Q00 | Q35 | 3 | 5 | 38.66 | B |
| EVALUATION EXAMPLE 28 | Q00 | Q23 | 2 | 3 | 41.63 | C |
| EVALUATION EXAMPLE 29 | Q00 | Q34 | 3 | 4 | 45.00 | A |
| EVALUATION EXAMPLE 30 | Q00 | Q45 | 4 | 5 | 46.85 | A |
| EVALUATION EXAMPLE 31 | Q00 | Q56 | 5 | 6 | 48.01 | A |
| EVALUATION EXAMPLE 32 | Q00 | Q11 | 1 | 1 | 53.13 | D |
| EVALUATION EXAMPLE 33 | Q00 | Q65 | 6 | 5 | 57.99 | A |
| EVALUATION EXAMPLE 34 | Q00 | Q54 | 5 | 4 | 59.04 | A |
| EVALUATION EXAMPLE 35 | Q00 | Q43 | 4 | 3 | 60.64 | A |
| EVALUATION EXAMPLE 36 | Q00 | Q32 | 3 | 2 | 63.43 | C |
| EVALUATION EXAMPLE 37 | Q00 | Q53 | 5 | 3 | 65.77 | B |
| EVALUATION EXAMPLE 38 | Q00 | Q21 | 2 | 1 | 69.44 | D |
| EVALUATION EXAMPLE 39 | Q00 | Q31 | 3 | 1 | 75.96 | D |
| EVALUATION EXAMPLE 40 | Q00 | Q41 | 4 | 1 | 79.38 | D |
| EVALUATION EXAMPLE 41 | Q00 | Q51 | 5 | 1 | 81.47 | D |
| EVALUATION EXAMPLE 42 | Q00 | Q10 | 1 | 0 | 90.00 | D |

SHUTTER BUTTON 524
LIGHT EMITTING UNIT 521

DISPLAY UNIT 522
SHUTTER BUTTON 524
523 MENU SWITCH

UPPER HOUSING 551

552 LOWER HOUSING

552 LOWER HOUSING

551 UPPER HOUSING

DISPLAY DEVICE WITH TOUCH DETECTING FUNCTION AND ELECTRONIC APPARATUS

CROSS REFERENCES TO RELATED APPLICATIONS

The present application is a continuation application of U.S. patent application Ser. No. 16/045,173, filed on Jul. 25, 2018, which application is a continuation application of U.S. patent application Ser. No. 15/928,508, filed on Mar. 22, 2018, issued as U.S. Pat. No. 10,061,422 on Aug. 28, 2018, which application is a continuation application of U.S. patent application Ser. No. 15/209,274, filed on Jul. 13, 2016, issued as U.S. Pat. No. 9,946,385 on Apr. 17, 2018, which application is a continuation application of U.S. patent application Ser. No. 14/220,943, filed on Mar. 20, 2014, issued as U.S. Pat. No. 9,471,165 on Oct. 18, 2016, which application claims priority to Japanese Priority Patent Application JP 2013-067627 filed in the Japan Patent Office on Mar. 27, 2013, the entire content of which is hereby incorporated by reference.

BACKGROUND

1. Technical Field

The present disclosure relates to a display device capable of detecting an external proximity object and an electronic apparatus, and in particular to a display device with a touch detecting function capable of detecting an external proximity object based on a change in capacitance and an electronic apparatus.

2. Description of the Related Art

Touch detection devices capable of detecting an external proximity object, which are what is called a touch panel, have been attracting attention in recent years. Touch panels are attached or integrated on display devices, such as liquid-crystal display devices, and are used for display devices with a touch detecting function. In display devices with a touch detecting function, displaying various types of button images and the like on a display device enables input of information using the touch panel as a substitute for general mechanical buttons. Such display devices with a touch detecting function including a touch panel require no input device, such as a keyboard, a mouse, and a keypad. As a result, display devices with a touch detecting function have been increasingly used for portable information terminals, such as mobile phones, besides for computers.

Some types of technologies for touch detection devices are known, including optical, resistive, and capacitive type, for example. By applying a capacitive touch detection device to a portable information terminal, it is possible to provide an apparatus with a relatively simple structure and less power consumption. Japanese Patent Application Laid-open Publication No. 2010-197576 (JP-A-2010-197576), for example, discloses a touch panel that makes a transparent electrode pattern invisible.

To provide a display device with a touch detecting function having a smaller thickness, a larger screen, or higher definition, it is necessary to lower the resistance of a touch detection electrode. The touch detection electrode is made of a translucent conductive oxide, such as an indium tin oxide (ITO), serving as a material of a translucent electrode. To lower the resistance of the touch detection electrode, it is effective to use a conductive material, such as a metal material. If a conductive material, such as a metal material, is used, interference between pixels of the display device and the conductive material, such as a metal material, may possibly cause moire to be visually recognized.

For the foregoing reasons, there is a need for a display device with a touch detecting function and an electronic apparatus that can reduce the possibility that moire is visually recognized while using a touch detection electrode made of a conductive material, such as a metal material.

SUMMARY

According to an aspect, a display device with a touch detecting function includes: a substrate; a display area in which pixels each composed of a plurality of color areas are arranged in a matrix on a plane parallel to a surface of the substrate; a touch detection electrode provided with a plurality of conductive thin wires extending on a plane parallel to the surface of the substrate, each of the conductive thin wires including a plurality of thin wire pieces each having a linear shape and including a first end and a second end, the second end of one of adjacent thin wire pieces and the first end of the other of the adjacent thin wire pieces being connected to each other; a drive electrode having capacitance for the touch detection electrode; and a display functional layer having a function to display an image on the display area. The adjacent thin wire pieces are arranged so as to be bent at a bent portion serving as a portion at which the second end of the one thin wire piece of the adjacent thin wire pieces is connected to the first end of the other thin wire piece of the adjacent thin wire pieces, and the conductive thin wires include a bent portion having an angle formed by the adjacent thin wire pieces different from angles of the other bent portions.

According to another aspect, an electronic apparatus has a display device with a touch detecting function. The display device with a touch detecting function includes: a substrate; a display area in which pixels each composed of a plurality of color areas are arranged in a matrix on a plane parallel to a surface of the substrate; a touch detection electrode provided with a plurality of conductive thin wires extending on a plane parallel to the surface of the substrate, each of the conductive thin wires including a plurality of thin wire pieces each having a linear shape and including a first end and a second end, the second end of one of adjacent thin wire pieces and the first end of the other of the adjacent thin wire pieces being connected to each other; a drive electrode having capacitance for the touch detection electrode; and a display functional layer having a function to display an image on the display area. The adjacent thin wire pieces are arranged so as to be bent at a bent portion serving as a portion at which the second end of the one thin wire piece of the adjacent thin wire pieces is connected to the first end of the other thin wire piece of the adjacent thin wire pieces, and the conductive thin wires include a bent portion having an angle formed by the adjacent thin wire pieces different from angles of the other bent portions.

Additional features and advantages are described herein, and will be apparent from the following Detailed Description and the figures.

BRIEF DESCRIPTION OF THE FIGURES

FIG. 17 is a diagram of moire evaluation of the display device with a touch detecting function according to the third modification of the first embodiment;

FIG. 19 is a diagram of moire evaluation of the display device with a touch detecting function according to the fourth modification of the first embodiment;

DETAILED DESCRIPTION

Exemplary aspects (embodiments) according to the present disclosure are described in greater detail with reference to the accompanying drawings. The contents disclosed in the following embodiments are not intended to limit the present disclosure. Components described below include components easily conceivable by those skilled in the art and components substantially identical. The components described below can be combined as appropriate. The explanation will be made in the following order.

1. Embodiments (Display Device with a Touch Detecting Function)
   1-1. First embodiment
   1-2. Second embodiment
   1-3. Third embodiment 2. Application Examples (Electronic Apparatuses)
Examples in which the display device with a touch detecting function according to the above-mentioned embodiments is applied to electronic apparatuses 3. Aspects of the Present Disclosure

Figure 1:
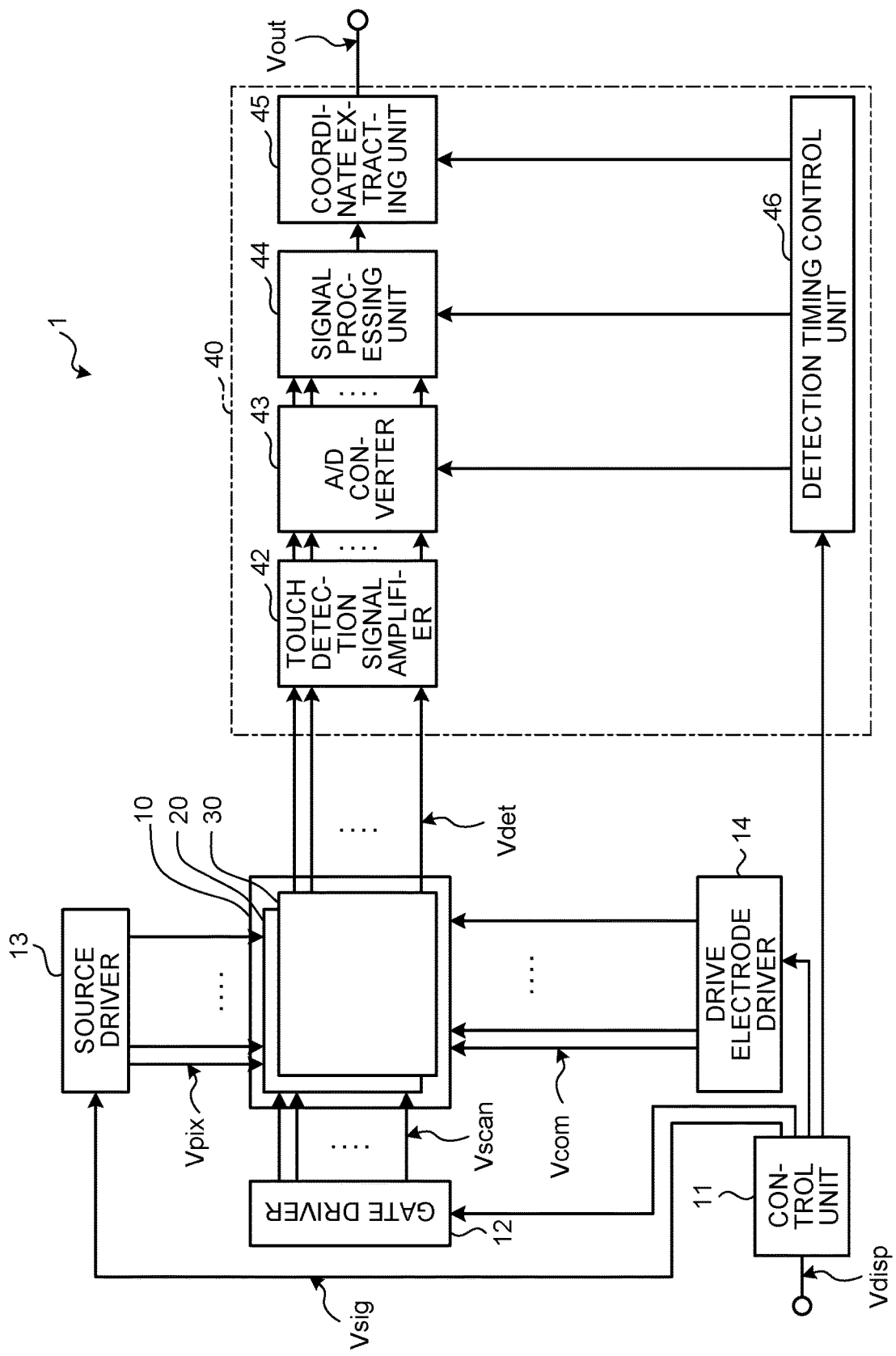
FIG. 1 is a block diagram of an exemplary configuration of a display device with a touch detecting function according to a first embodiment.

1. EMBODIMENTS 1-1. First Embodiment 1-1A. Exemplary Configuration
Exemplary Entire Configuration FIG. 1 is a block diagram of an exemplary configuration of a display device with a touch detecting function according to a first embodiment. A display device 1 with a touch detecting function includes a display unit 10 with a touch detecting function, a control unit 11, a gate driver 12, a source driver 13, a drive electrode driver 14, and a touch detecting unit 40. In the display device 1 with a touch detecting function, the display unit 10 with a touch detecting function has a touch detecting function. The display unit 10 with a touch detecting function is a device in which a liquid-crystal display unit 20 provided with liquid-crystal display elements as display elements is integrated with a capacitive touch detecting device 30. The display unit 10 with a touch detecting function may be a device in which the capacitive touch detecting device 30 is mounted on the liquid-crystal display unit 20 provided with liquid-crystal display elements as display elements. The liquid-crystal display unit 20 may be an organic electro-luminescence (EL) display unit, for example.

The liquid-crystal display unit 20 performs sequential scanning on each horizontal line based on a scanning signal Vscan supplied from the gate driver 12, thereby performing display, which will be described later. The control unit 11 is a circuit that supplies control signals to the gate driver 12, the source driver 13, the drive electrode driver 14, and the touch detecting unit 40 based on a video signal Vdisp supplied from the outside, thereby controlling these units so as to operate in synchronization with one another.

The gate driver 12 has a function to sequentially select a horizontal line to be a target of display drive of the display unit 10 with a touch detecting function based on the control signal supplied from the control unit 11.

The source driver 13 is a circuit that supplies a pixel signal Vpix to each sub-pixel SPix, which will be described later, of the display unit 10 with a touch detecting function based on the control signal supplied from the control unit 11.

The drive electrode driver 14 is a circuit that supplies a drive signal Vcom to drive electrodes COML, which will be described later, of the display unit 10 with a touch detecting function based on the control signal supplied from the control unit 11.

The touch detecting unit 40 is a circuit that detects whether a touch (a contact or a proximity state, which will be described later) is made on the touch detecting device 30 based on the control signal supplied from the control unit 11 and a touch detection signal Vdet supplied from the touch detecting device 30 of the display unit 10 with a touch detecting function. If a touch is made, the touch detecting unit 40 derives the coordinates of the touch in a touch detection area. The touch detecting unit 40 includes a touch detection signal amplifier 42, an analog/digital (A/D) converter 43, a signal processing unit 44, a coordinate extracting unit 45, and a detection timing control unit 46.

The touch detection signal amplifier 42 amplifies a touch detection signal Vdet supplied from the touch detecting device 30. The touch detection signal amplifier 42 may include an analog low pass filter. The analog low pass filter removes high-frequency components (noise components) included in the touch detection signal Vdet, thereby extracting and outputting touch components.

Basic Principle of Capacitive Touch Detection

Figure 2:
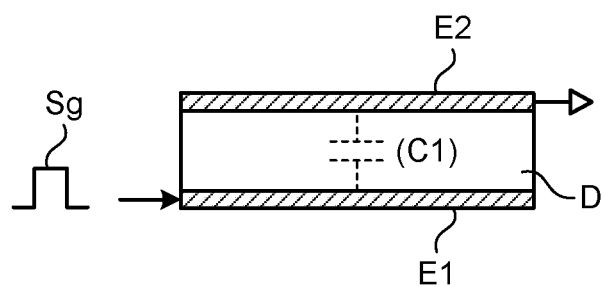
FIG. 2 is an explanatory view illustrating a state where no finger is in contact or in proximity with a device for explanation of the basic principle of a capacitive touch detection technology.

The touch detecting device 30 operates based on the basic principle of capacitive touch detection, thereby outputting the touch detection signal Vdet. The following describes the basic principle of touch detection in the display device 1 with a touch detecting function according to the first embodiment with reference to FIG. 1 to FIG. 6. FIG. 2 is an explanatory view illustrating a state where no finger is in contact or in proximity with a device for explanation of the basic principle of a capacitive touch detection technology.

Figure 3:
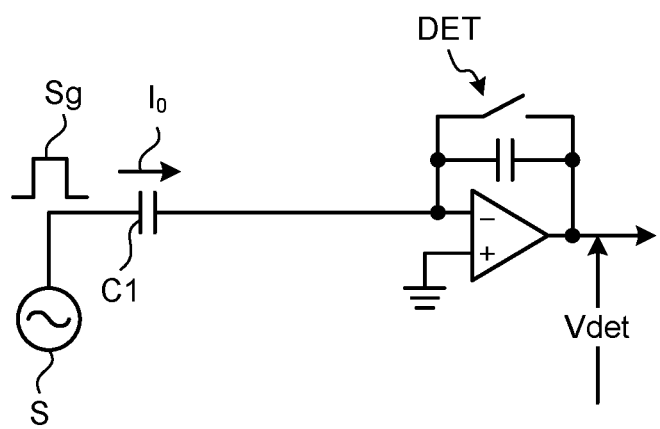
FIG. 3 is a view for explaining an example of an equivalent circuit in the state where no finger is in contact or in proximity with a device illustrated in FIG. 2.
Figure 4:
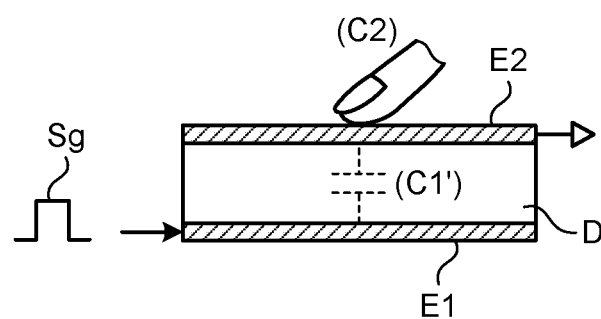
FIG. 4 is an explanatory view illustrating a state where a finger is in contact or in proximity with a device for explanation of the basic principle of the capacitive touch detection technology.
Figure 5:
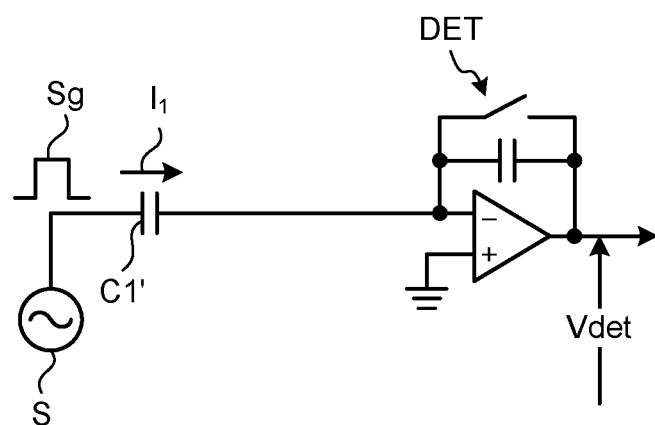
FIG. 5 is a view for explaining an example of the equivalent circuit in the state where a finger is in contact or in proximity with a device illustrated in FIG. 4.
Figure 6:
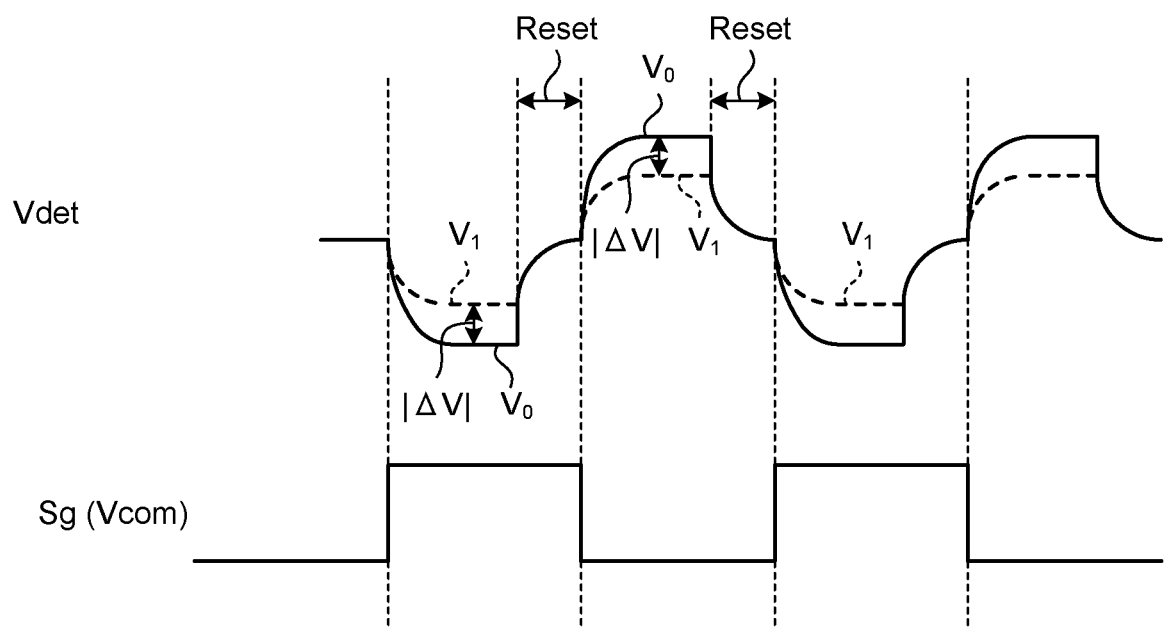
FIG. 6 is a diagram of an example of a waveform of a drive signal and a touch detection signal.

FIG. 3 is a view for explaining an example of an equivalent circuit in the state where no finger is in contact or in proximity with a device illustrated in FIG. 2. FIG. 4 is an explanatory view illustrating a state where a finger is in contact or in proximity with the device for explanation of the basic principle of the capacitive touch detection technology. FIG. 5 is a view for explaining an example of the equivalent circuit in the state where a finger is in contact or in proximity with a device illustrated in FIG. 4. FIG. 6 is a diagram of an example of a waveform of a drive signal and a touch detection signal.

As illustrated in FIG. 2 and FIG. 4, capacitive elements C1 and C1' each include a pair of electrodes of a drive electrode E1 and a touch detection electrode E2 arranged in a manner facing each other with a dielectric D interposed therebetween, for example. As illustrated in FIG. 3, one end of the capacitive element C1 is coupled to an alternating-current (AC) signal source (a drive signal source) S, whereas the other end thereof is coupled to a voltage detector (a touch detecting unit) DET. The voltage detector DET is an integration circuit included in the touch detection signal amplifier 42 illustrated in FIG. 1, for example.

If the AC signal source S applies an alternating-current (AC) rectangular wave Sg at a predetermined frequency (e.g., approximately several kilohertz to several hundred kilohertz) to the drive electrode E1 (the one end of the capacitive element C1), an output waveform (touch detection signal Vdet) is generated via the voltage detector DET coupled to the touch detection electrode E2 (the other end of the capacitive element C1). The AC rectangular wave Sg corresponds to a touch drive signal Vcomt, which will be described later.

In the state where no finger is in contact (or in proximity) with a device (a non-contact state), an electric current $I_0$ depending on the capacitance value of the capacitive element C1 flows in association with charge and discharge to the capacitive element C1 as illustrated in FIG. 2 and FIG. 3. As illustrated in FIG. 6, the voltage detector DET converts fluctuations in the electric current $I_0$ depending on the AC rectangular wave Sg into fluctuations in the voltage (a waveform $V_0$ indicated by a solid line).

By contrast, in the state where a finger is in contact (or in proximity) with a device (a contact state), capacitance C2 generated by the finger is in contact or in proximity with the touch detection electrode E2 as illustrated in FIG. 4. This blocks capacitance of a fringe between the drive electrode E1 and the touch detection electrode E2. As a result, the capacitive element C1' having a capacitance value smaller than that of the capacitive element C1 is obtained. In the equivalent circuit illustrated in FIG. 5, an electric current $I_1$ flows through the capacitive element C1'. As illustrated in FIG. 6, the voltage detector DET converts fluctuations in the electric current $I_1$ depending on the AC rectangular wave Sg into fluctuations in the voltage (a waveform $V_1$ indicated by a dotted line). In this case, the waveform $V_1$ has amplitude smaller than that of the waveform $V_0$. Thus, an absolute value $|\Delta V|$ of the voltage difference between the waveform $V_0$ and the waveform $V_1$ varies depending on an influence of an object, such as a finger, approaching the device from the outside. To detect the absolute value $|\Delta V|$ of the voltage difference between the waveform $V_0$ and the waveform $V_1$ with high accuracy, the voltage detector DET preferably operates while providing a period Reset for resetting charge and discharge of a capacitor based on the frequency of the AC rectangular wave Sg by performing switching in the circuit.

The touch detecting device 30 illustrated in FIG. 1 performs sequential scanning on each detection block based on the drive signal Vcom (touch drive signal Vcomt, which will be described later) supplied from the drive electrode driver 14, thereby performing touch detection.

The touch detecting device 30 outputs the touch detection signal Vdet for each detection block from a plurality of touch detection electrodes TDL, which will be described later, via the voltage detector DET illustrated in FIG. 3 or FIG. 5, thereby supplying the touch detection signal Vdet to the touch detection signal amplifier 42 of the touch detecting unit 40.

The A/D converter 43 is a circuit that samples an analog signal output from the touch detection signal amplifier 42 at a timing synchronized with the drive signal Vcom, thereby converting the analog signal into a digital signal.

The signal processing unit 44 includes a digital filter. The digital filter reduces frequency components (noise components) other than the frequency at which the drive signal Vcom is sampled included in the output signal of the A/D converter 43. The signal processing unit 44 is a logic circuit that detects whether a touch is made on the touch detecting device 30 based on the output signal from the A/D converter 43. The signal processing unit 44 performs processing for extracting only the voltage difference caused by a finger. The voltage difference caused by the finger corresponds to the absolute value $|\Delta V|$ of the difference between the waveform $V_0$ and the waveform $V_1$. The signal processing unit 44 may perform an arithmetic operation for averaging the absolute value $|\Delta V|$ per detection block, thereby deriving the average value of the absolute value $|\Delta V|$. Thus, the signal processing unit 44 can reduce an influence caused by noise. The signal processing unit 44 compares the detected voltage difference caused by the finger with a predetermined threshold voltage. If the voltage difference is equal to or larger than the threshold voltage, the signal processing unit 44 determines that an external proximity object approaching the device from the outside is in contact with the device. If the voltage difference is smaller than the threshold voltage, the signal processing unit 44 determines that the external proximity object is not in contact with the device. Thus, the touch detecting unit 40 can perform touch detection.

The coordinate extracting unit 45 is a logic circuit that derives, when a touch is detected by the signal processing unit 44, the touch panel coordinates of the touch. The detection timing control unit 46 performs control such that the A/D converter 43, the signal processing unit 44, and the coordinate extracting unit 45 operate in synchronization with one another. The coordinate extracting unit 45 outputs touch panel coordinates as a signal output $V_{out}$.

Module

Figure 7:
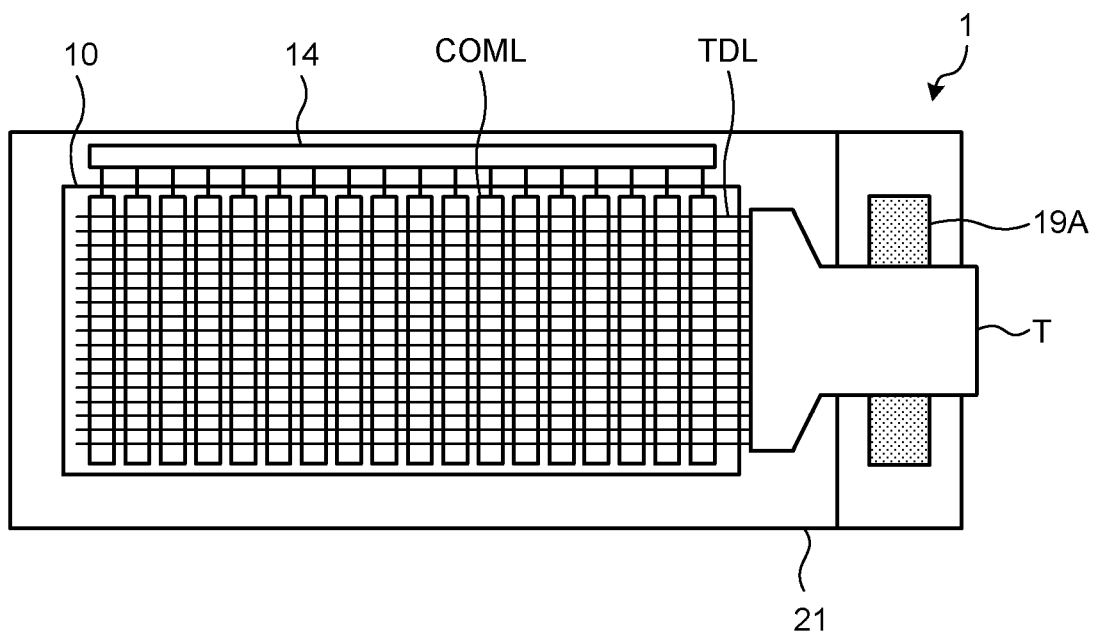
FIG. 7 is a view of an example of a module on which the display device with a touch detecting function is mounted.
Figure 8:
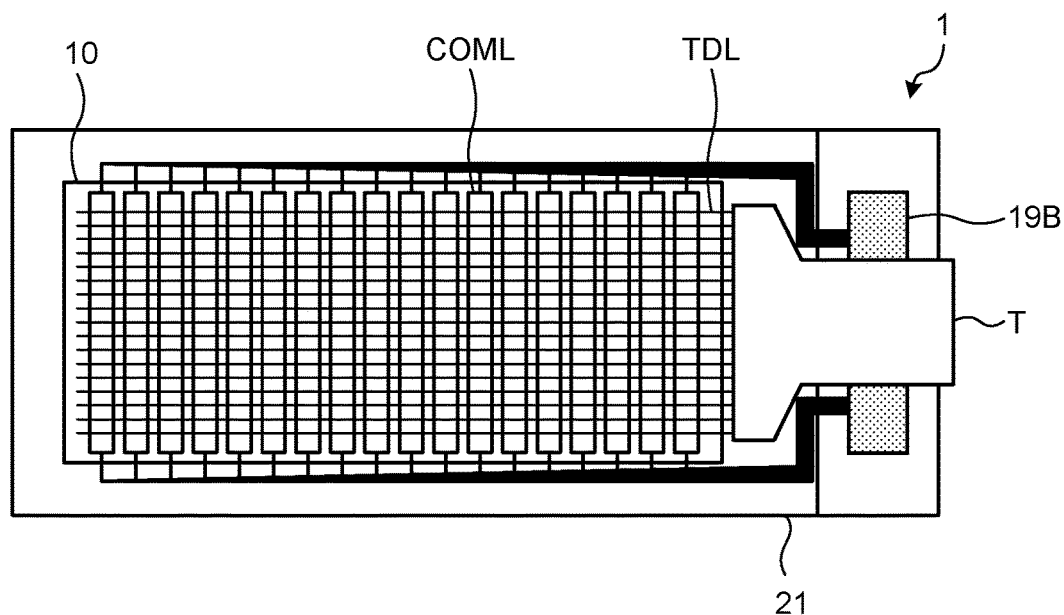
FIG. 8 is a view of another example of the module on which the display device with a touch detecting function is mounted.

FIGS. 7 and 8 are views of examples of a module on which the display device with a touch detecting function is mounted. To mount the display device 1 with a touch detecting function on the module, the drive electrode driver 14 may be formed above a thin-film transistor (TFT) substrate 21, which is a glass substrate, as illustrated in FIG. 7.

As illustrated in FIG. 7, the display device 1 with a touch detecting function includes the display unit 10 with a touch detecting function, the drive electrode driver 14, and a chip on glass (COG) 19A. FIG. 7 schematically illustrates the drive electrodes COML and the touch detection electrodes TDL in the display unit 10 with a touch detecting function viewed in a direction perpendicular to the surface of the TFT substrate 21, which will be described later. The touch detection electrodes TDL are formed to intersect with the drive electrodes COML in a grade separated manner. In other words, the drive electrodes COML are formed in a direction along one side of the display unit 10 with a touch detecting function, whereas the touch detection electrodes TDL are formed in a direction along the other side of the display unit 10 with a touch detecting function. The output terminal of the touch detection electrodes TDL is provided at an end in the other side direction of the display unit 10 with a touch detecting function. The output terminal is coupled to the touch detecting device 40 mounted on the outside of the module via a terminal T formed of a flexible substrate or the like. The drive electrode driver 14 is formed on the TFT substrate 21, which is a glass substrate. The COG 19A is a chip mounted on the TFT substrate 21 and includes circuits required for a display operation, such as the control unit 11, the gate driver 12, and the source driver 13 illustrated in FIG. 1. In the display device 1 with a touch detecting function, the drive electrode driver 14 may be included in a COG as illustrated in FIG. 8.

The module, on which the display device 1 with a touch detecting function is mounted, includes a COG 19B as illustrated in FIG. 8. The COG 19B illustrated in FIG. 8 includes the drive electrode driver 14 besides the circuits required for a display operation described above. The display device 1 with a touch detecting function performs line-sequential scanning on each horizontal line in a display operation, which will be described later. By contrast, the display device 1 with a touch detecting function sequentially applies the drive signal Vcom to the drive electrodes COML in a touch detection operation, thereby performing line-sequential scanning on each detection line.

Display Unit with a Touch Detecting Function

Figure 9:
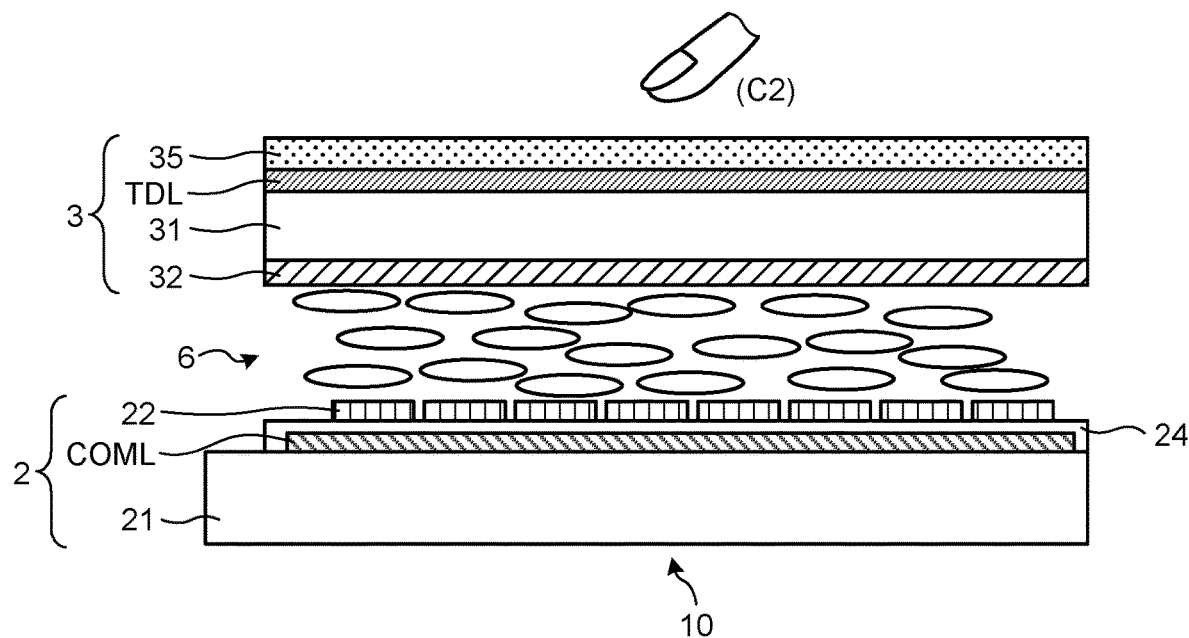
FIG. 9 is a sectional view of a schematic sectional structure of a display unit with a touch detecting function according to the first embodiment.
Figure 10:
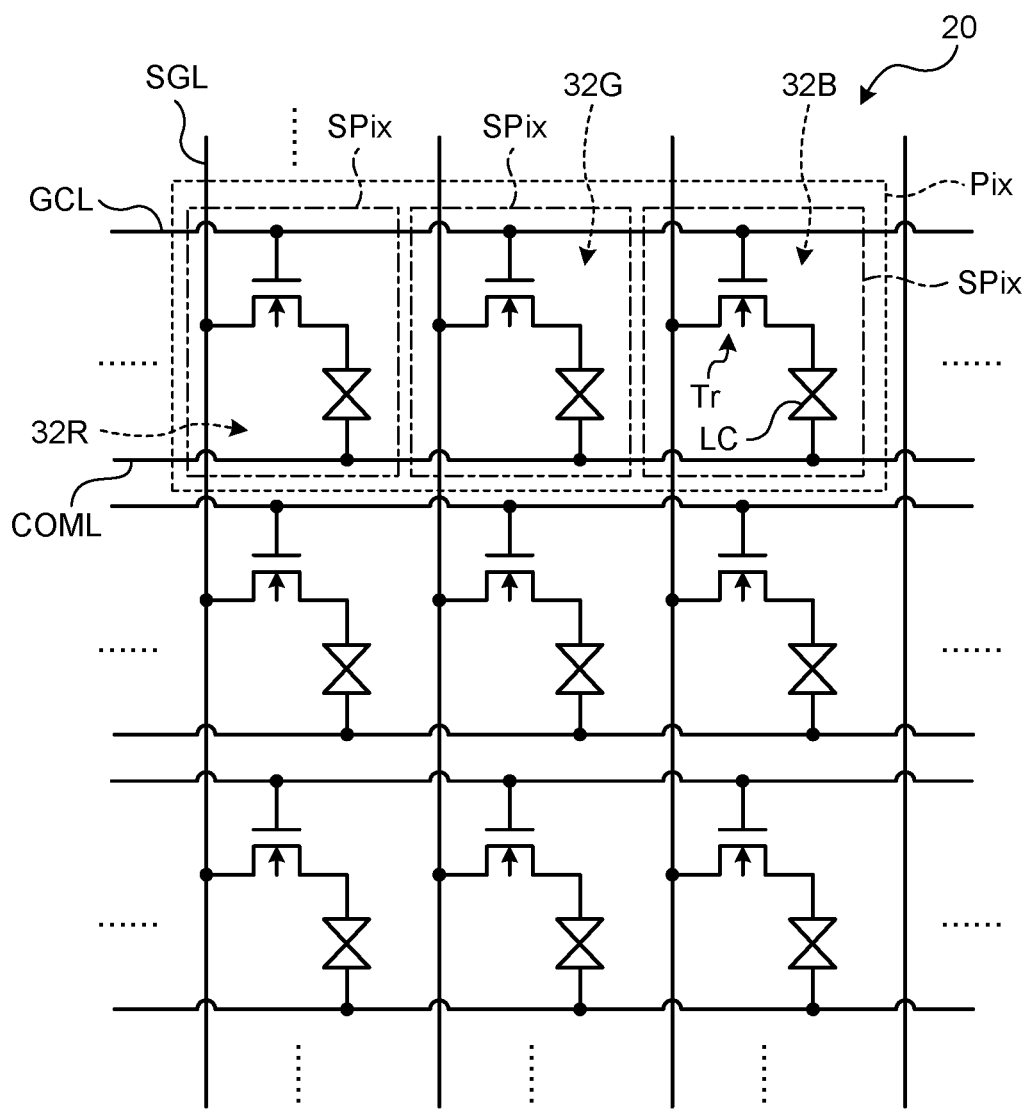
FIG. 10 is a circuit diagram of pixel arrangement of the display unit with a touch detecting function according to the first embodiment.

The following describes an exemplary configuration of the display unit 10 with a touch detecting function in greater detail. FIG. 9 is a sectional view of a schematic sectional structure of the display unit with a touch detecting function according to the first embodiment. FIG. 10 is a circuit diagram of pixel arrangement of the display unit with a touch detecting function according to the first embodiment. The display unit 10 with a touch detecting function includes a pixel substrate 2, a counter substrate 3, and a liquid-crystal layer 6. The counter substrate 3 is arranged in a manner facing the surface of the pixel substrate 2 in a perpendicular direction. The liquid-crystal layer 6 is inserted between the pixel substrate 2 and the counter substrate 3.

The pixel substrate 2 includes the TFT substrate 21, a plurality of pixel electrodes 22, a plurality of drive electrodes COML, and an insulation layer 24. The TFT substrate 21 serves as a circuit board. The pixel electrodes 22 are arranged in a matrix above the TFT substrate 21. The drive electrodes COML are formed between the TFT substrate 21 and the pixel electrodes 22. The insulation layer 24 electrically insulates the pixel electrodes 22 from the drive electrodes COML. The TFT substrate 21 is provided with a thin-film transistor (TFT) element Tr of each sub-pixel SPix illustrated in FIG. 10 and wiring, such as a signal line SGL and a scanning line GCL. The signal line SGL supplies the pixel signal Vpix to each pixel electrode 22 illustrated in FIG. 9, whereas the scanning line GCL drives each TFT element Tr. Thus, the signal line SGL extends on a plane parallel to the surface of the TFT substrate 21 and supplies the pixel signal Vpix used to display an image to a pixel. The liquid-crystal display unit 20 illustrated in FIG. 10 includes a plurality of sub-pixels SPix arranged in a matrix. The sub-pixels Spix each include the TFT element Tr and a liquid-crystal element LC. The TFT element Tr is formed of a thin-film transistor, and specifically of an n-channel metal oxide semiconductor (MOS) TFT in this example. One of the source and the drain of the TFT element Tr is coupled to the signal line SGL, the gate thereof is coupled to the scanning line GCL, and the other of the source and the drain thereof is coupled to one end of the liquid-crystal element LC. The one end of the liquid-crystal element LC is coupled to the drain of the TFT element Tr, whereas the other end thereof is coupled to the drive electrode COML, for example.

The sub-pixel SPix illustrated in FIG. 10 is coupled to other sub-pixels SPix belonging to the same row in the liquid-crystal display unit 20 by the scanning line GCL. The scanning line GCL is coupled to the gate driver 12 and is supplied with the scanning signal Vscan from the gate driver 12. The sub-pixel SPix is further coupled to other sub-pixels SPix belonging to the same column in the liquid-crystal display unit 20 by the signal line SGL. The signal line SGL is coupled to the source driver 13 and is supplied with the pixel signal Vpix from the source driver 13. The sub-pixel SPix is further coupled to the other sub-pixels SPix belonging to the same row in the liquid-crystal display unit 20 by the drive electrode COML. The drive electrode COML is coupled to the drive electrode driver 14 and is supplied with the drive signal Vcom from the drive electrode driver 14. In other words, a plurality of sub-pixels SPix belonging to the same row share a single drive electrode COML in this example. The direction in which the drive electrode COML extends according to the first embodiment is parallel to the direction in which the scanning line GCL extends. The direction in which the drive electrode COML extends according to the first embodiment is not limited thereto. The direction in which the drive electrode COML extends may be a direction parallel to the direction in which the signal line SGL extends, for example.

The gate driver 12 illustrated in FIG. 1 applies the scanning signal Vscan to the gate of the TFT element Tr of a pixel Pix via the scanning line GCL illustrated in FIG. 10. Thus, the gate driver 12 sequentially selects a row (a horizontal line) out of the sub-pixels SPix arranged in a matrix in the liquid-crystal display unit 20 as a target of display drive. The source driver 13 illustrated in FIG. 1 supplies the pixel signal Vpix to each of the sub-pixels SPix constituting the horizontal line sequentially selected by the gate driver 12 via the signal line SGL illustrated in FIG. 10. These sub-pixels SPix perform display of the horizontal line based on the supplied pixel signal Vpix. The drive electrode driver 14 illustrated in FIG. 1 applies the drive signal Vcom, thereby driving the drive electrodes COML of each block composed of a predetermined number of drive electrodes COML illustrated in FIG. 7 and FIG. 8.

As described above, the gate driver 12 drives so as to perform time-division line-sequential scanning on the scanning line GCL, whereby the liquid-crystal display unit 20 sequentially selects a horizontal line. The source driver 13 supplies the pixel signal Vpix to the sub-pixels SPix belonging to the horizontal line, whereby the liquid-crystal display unit 20 performs display of the horizontal line. To perform the display operation, the drive electrode driver 14 applies the drive signal Vcom to a block including the drive electrodes COML corresponding to the horizontal line.

Figure 11:
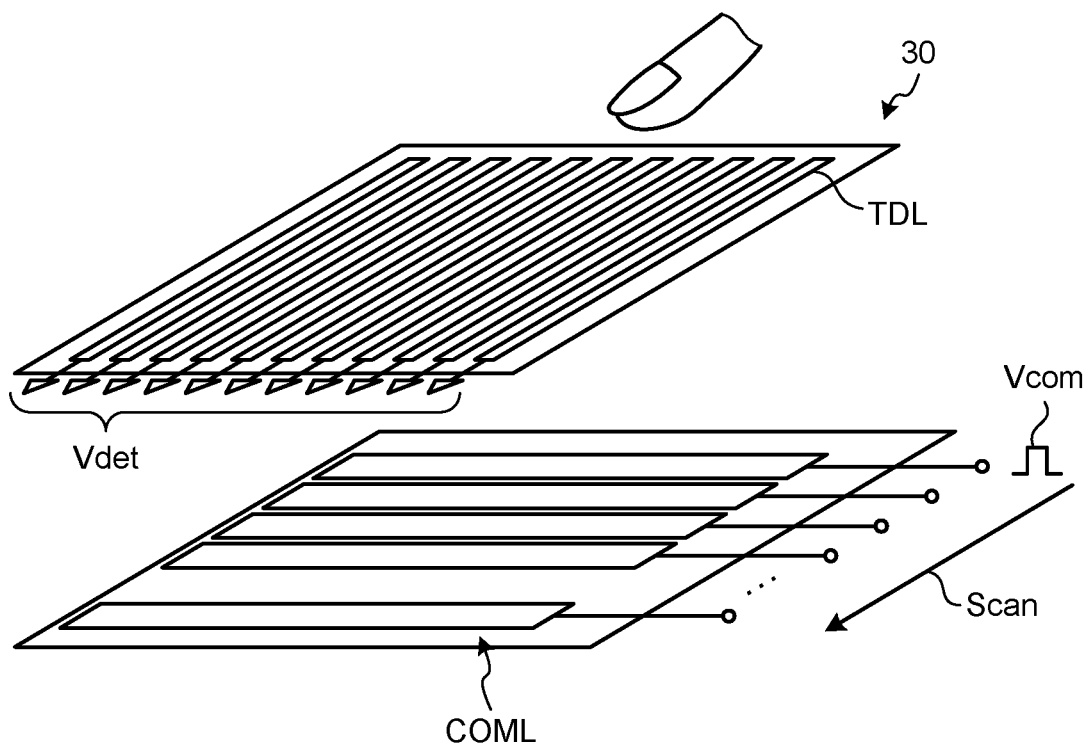
FIG. 11 is a perspective view of an exemplary configuration of drive electrodes and touch detection electrodes of the display device with a touch detecting function according to the first embodiment.

The drive electrode COML according to the first embodiment functions as a drive electrode of the liquid-crystal display unit 20 and as a drive electrode of the touch detecting device 30. FIG. 11 is a perspective view of an exemplary configuration of the drive electrodes and the touch detection electrodes of the display device with a touch detecting function according to the first embodiment. The drive electrodes COML illustrated in FIG. 11 face the pixel electrodes 22 in the direction perpendicular to the surface of the TFT substrate 21 as illustrated in FIG. 9. The touch detecting device 30 includes the drive electrodes COML provided to the pixel substrate 2 and the touch detection electrodes TDL provided to the counter substrate 3. The touch detection electrodes TDL are formed into stripe-like electrode patterns extending in a direction intersecting with the extending direction of the electrode patterns of the drive electrodes COML. The touch detection electrodes TDL face the drive electrodes COML in the direction perpendicular to the surface of the TFT substrate 21. The electrode patterns of the touch detection electrodes TDL are coupled to the input terminal of the touch detection signal amplifier 42 of the touch detecting unit 40. The electrode patterns of the drive electrodes COML and the touch detection electrodes TDL intersecting with each other generate capacitance at the intersections. The touch detection electrodes TDL or the drive electrodes COML (drive electrode block) are not necessarily separated from one another in stripes. The touch detection electrodes TDL or the drive electrodes COML (drive electrode block) may be formed into a comb shape, for example. The touch detection electrodes TDL or the drive electrodes COML (drive electrode block) simply needs to be separated from one another. The shape of slits separating the drive electrodes COML may be a straight line or a curved line.

With this configuration, the touch detecting device 30 performs a touch detection operation by driving the drive electrode driver 14 so as to perform time-division line-sequential scanning on drive electrode blocks. As a result, the touch detecting device 30 sequentially selects a detection block of the drive electrodes COML in a scanning direction Scan. The touch detecting device 30 then outputs the touch detection signal Vdet from the touch detection electrodes TDL. Thus, the touch detecting device 30 performs touch detection in the detection block. In other words, the drive electrode block corresponds to the drive electrode E1 in the basic principle of touch detection described above, whereas the touch detection electrode TDL corresponds to the touch detection electrode E2. The touch detecting device 30 detects a touch in accordance with the basic principle. As illustrated in FIG. 11, the electrode patterns intersecting with each other form a capacitive touch sensor in a matrix. Scanning the entire touch detection surface of the touch detecting device 30 enables detection of the position where the external proximity object is in contact or in proximity with the device.

The liquid-crystal layer 6 modulates light passing therethrough depending on the state of an electric field. The liquid-crystal layer 6 is provided with liquid crystals of a lateral electric-field mode, such as a fringe field switching (FFS) mode and an in-plane switching (IPS) mode. An orientation film may be provided between the liquid-crystal layer 6 and the pixel substrate 2 and between the liquid-crystal layer 6 and the counter substrate 3 illustrated in FIG. 9.

The counter substrate 3 includes a glass substrate 31 and a color filter 32 formed at one surface of the glass substrate 31. The touch detection electrode TDL serving as the detection electrode of the touch detecting device 30 is formed at the other surface of the glass substrate 31. A polarization plate 35 is provided above the touch detection electrode TDL.

In the color filter 32 illustrated in FIG. 9, color areas of the color filter colored with three colors of red (R), green (G), and blue (B) are periodically arranged, for example. Color areas 32R, 32G, and 32B (refer to FIG. 10) colored with the three colors of R, G, and B, respectively, are associated with the sub-pixels SPix illustrated in FIG. 10. The color areas 32R, 32G, and 32B serve as a group to form the pixel Pix. The pixels Pix are arranged in a matrix along a direction parallel to the scanning line GCL and a direction parallel to the signal line SGL, thereby forming a display area Ad, which will be described later. The color filter 32 faces the liquid-crystal layer 6 in the direction perpendicular to the TFT substrate 21. Thus, the sub-pixel SPix can display a single color. The color filter 32 may have another color combination as long as the color areas are colored with colors different from one another. The color filter 32 is not necessarily provided. There may be an area in which the color filter 32 is not present, that is, an uncolored sub-pixel SPix.

The glass substrate 31 corresponds to a specific example of a "substrate" in the present disclosure. The color areas 32R, 32G, and 32B correspond to a specific example of a "color area" in the present disclosure. The pixel Pix corresponds to a specific example of a "pixel" in the present disclosure. The touch detection electrode TDL corresponds to a specific example of a "touch detection electrode" in the present disclosure. The drive electrode COML corresponds to a specific example of a "drive electrode" in the present disclosure. The liquid-crystal layer 6 corresponds to a specific example of a "display functional layer" in the present disclosure.

1-1B. Operation and Action

The following describes an operation and action of the display device 1 with a touch detecting function according to the first embodiment.

The drive electrode COML functions as a common drive electrode of the liquid-crystal display unit 20 and as a drive electrode of the touch detecting device 30. As a result, the drive signal Vcom may possibly affect both the liquid-crystal display unit 20 and the touch detecting device 30. To address this, the drive signal Vcom is applied to the drive electrode COML separately in a display period B to perform a display operation and in a touch detection period A to perform a touch detection operation. The drive electrode driver 14 applies the drive signal Vcom as a display drive signal in the display period B to perform a display operation. The drive electrode driver 14 applies the drive signal Vcom as a touch drive signal in the touch detection period A to perform a touch detection operation. In the description below, the drive signal Vcom serving as the display drive signal is referred to as a display drive signal Vcomd, whereas the drive signal Vcom serving as the touch drive signal is referred to as a touch drive signal Vcomt.

Outline of the Entire Operation

Based on the video signal Vdisp supplied from the outside, the control unit 11 supplies control signals to the gate driver 12, the source driver 13, the drive electrode driver 14, and the touch detecting unit 40, thereby controlling these units so as to operate in synchronization with one another. The gate driver 12 supplies the scanning signal Vscan to the liquid-crystal display unit 20 in the display period B, thereby sequentially selecting a horizontal line to be a target of display drive. The source driver 13 supplies the pixel signal Vpix to each pixel Pix constituting the horizontal line selected by the gate driver 12 in the display period B.

In the display period B, the drive electrode driver 14 applies the display drive signal Vcomd to a drive electrode block relating to the horizontal line. In the touch detection period A, the drive electrode driver 14 sequentially applies the touch drive signal Vcomt to a drive electrode block relating to the touch detection operation, thereby sequentially selecting one detection block. The display unit 10 with a touch detecting function performs a display operation based on the signals supplied from the gate driver 12, the source driver 13, and the drive electrode driver 14 in the display period B. The display unit 10 with a touch detecting function performs a touch detection operation based on the signal supplied from the drive electrode driver 14 and outputs the touch detection signal Vdet from the touch detection electrode TDL in the touch detection period A. The touch detection signal amplifier 42 amplifies and outputs the touch detection signal Vdet. The A/D converter 43 converts the analog signal output from the touch detection signal amplifier 42 into a digital signal at a timing synchronized with the touch drive signal Vcomt. The signal processing unit 44 detects whether a touch is made on the touch detecting device 30 based on the output signal from the A/D converter 43. The coordinate extracting unit 45 derives, when a touch is detected by the signal processing unit 44, the touch panel coordinates of the touch.

Specific Operation

Figure 12:
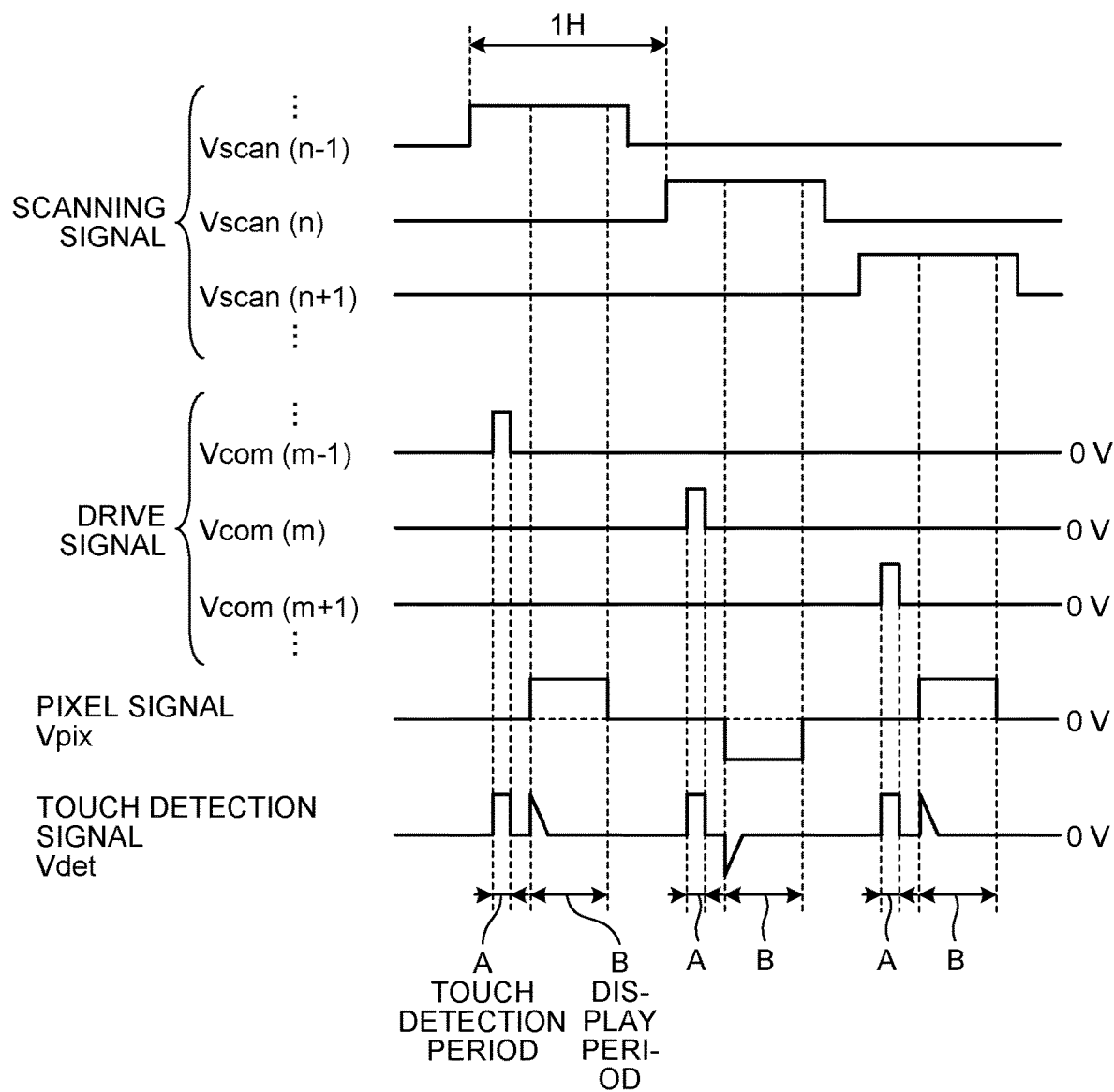
FIG. 12 is a timing waveform chart of an exemplary operation of the display device with a touch detecting function according to the first embodiment.

The following describes a specific operation of the display device 1 with a touch detecting function. FIG. 12 is a timing waveform chart of an exemplary operation of the display device with a touch detecting function according to the first embodiment. As illustrated in FIG. 12, the liquid-crystal display unit 20 performs sequential scanning on each horizontal line of successive scanning lines GCL of the (n−1)-th row, the n-th row, and the (n+1)-th row among the scanning lines GCL based on the scanning signal Vscan supplied from the gate driver 12, thereby performing display. Similarly, the drive electrode driver 14 supplies the drive signal Vcom to successive drive electrodes COML of the (m−1)-th column, the m-th column, and the (m+1)-th column among the drive electrodes COML of the display unit 10 with a touch detecting function based on the control signal supplied from the control unit 11.

As described above, the display device 1 with a touch detecting function performs the touch detection operation (touch detection period A) and the display operation (display period B) in a time-division manner in each display horizontal period (1H). In the touch detection operation, the display device 1 with a touch detecting function selects a different drive electrode COML and applies the drive signal Vcom thereto in each display horizontal period 1H, thereby performing scanning for touch detection. The following describes the operation in greater detail.

The gate driver 12 applies the scanning signal Vscan to the scanning line GCL of the (n−1)-th row, thereby changing a scanning signal Vscan(n−1) from a low level to a high level. This starts a display horizontal period 1H.

In the touch detection period A, the drive electrode driver 14 applies the drive signal Vcom to the drive electrode COML of the (m−1)-th column, thereby changing a drive signal Vcom(m−1) from a low level to a high level. The drive signal Vcom(m−1) is transmitted to the touch detection electrode TDL via capacitance, thereby changing the touch detection signal Vdet. When the drive signal Vcom(m−1) changes from the high level to the low level, the touch detection signal Vdet changes in the same manner. The waveform of the touch detection signal Vdet in the touch detection period A corresponds to the touch detection signal Vdet in the basic principle of touch detection described above. The A/D converter 43 carries out A/D conversion on the touch detection signal Vdet in the touch detection period A, thereby performing touch detection. Thus, the display device 1 with a touch detecting function performs touch detection of one detection line.

In the display period B, the source driver 13 applies the pixel signal Vpix to the signal line SGL, thereby performing display of a horizontal line. As illustrated in FIG. 12, the change in the pixel signal Vpix is transmitted to the touch detection electrode TDL via parasitic capacitance, thereby changing the touch detection signal Vdet. In the display period B, however, the A/D converter 43 carries out no A/D conversion, making it possible to suppress an influence of the change in the pixel signal Vpix on touch detection. After the source driver 13 completes supplying the pixel signal Vpix, the gate driver 12 changes the scanning signal Vscan (n−1) of the scanning line GCL of the (n−1)-th row from the high level to the low level. Thus, the display horizontal period is terminated.

Subsequently, the gate driver 12 applies the scanning signal Vscan to the scanning line GCL of the n-th row, which is different from the previous scanning line GCL, thereby changing a scanning signal Vscan(n) from a low level to a high level. This starts a next display horizontal period.

In the subsequent touch detection period A, the drive electrode driver 14 applies the drive signal Vcom to the drive electrode COML of the m-th column, which is different from the previous drive electrode COML. The A/D converter 43 carries out A/D conversion on the change in the touch detection signal Vdet, thereby performing touch detection of the detection line.

In the display period B, the source driver 13 applies the pixel signal Vpix to the signal line SGL, thereby performing display of a horizontal line. The drive electrode driver 14 applies the display drive signal Vcomd to the drive electrode COML as a common potential. At this time, the potential of the display drive signal Vcomd is the same as that of the low level of the touch drive signal Vcomt in the touch detection period A, for example. The display device 1 with a touch detecting function according to the first embodiment performs dot inversion drive. As a result, the polarity of the pixel signal Vpix applied by the source driver 13 is inverted from that in the previous display horizontal period 1H. After the display period B is terminated, the current display horizontal period 1H is terminated.

By repeating the operation described above, the display device 1 with a touch detecting function performs a display operation by scanning the entire display surface and performs a touch detection operation by scanning the entire touch detection surface.

The display device 1 with a touch detecting function performs the touch detection operation in the touch detection period A and performs the display operation in the display period B in a display horizontal period (1H). Because the touch detection operation and the display operation are performed separately in the respective periods, the display device 1 with a touch detecting function can perform both the display operation and the touch detection operation in a single display horizontal period 1H. In addition, it is possible to suppress an influence of the display operation on the touch detection.

Arrangement of the Touch Detection Electrode

Figure 13:
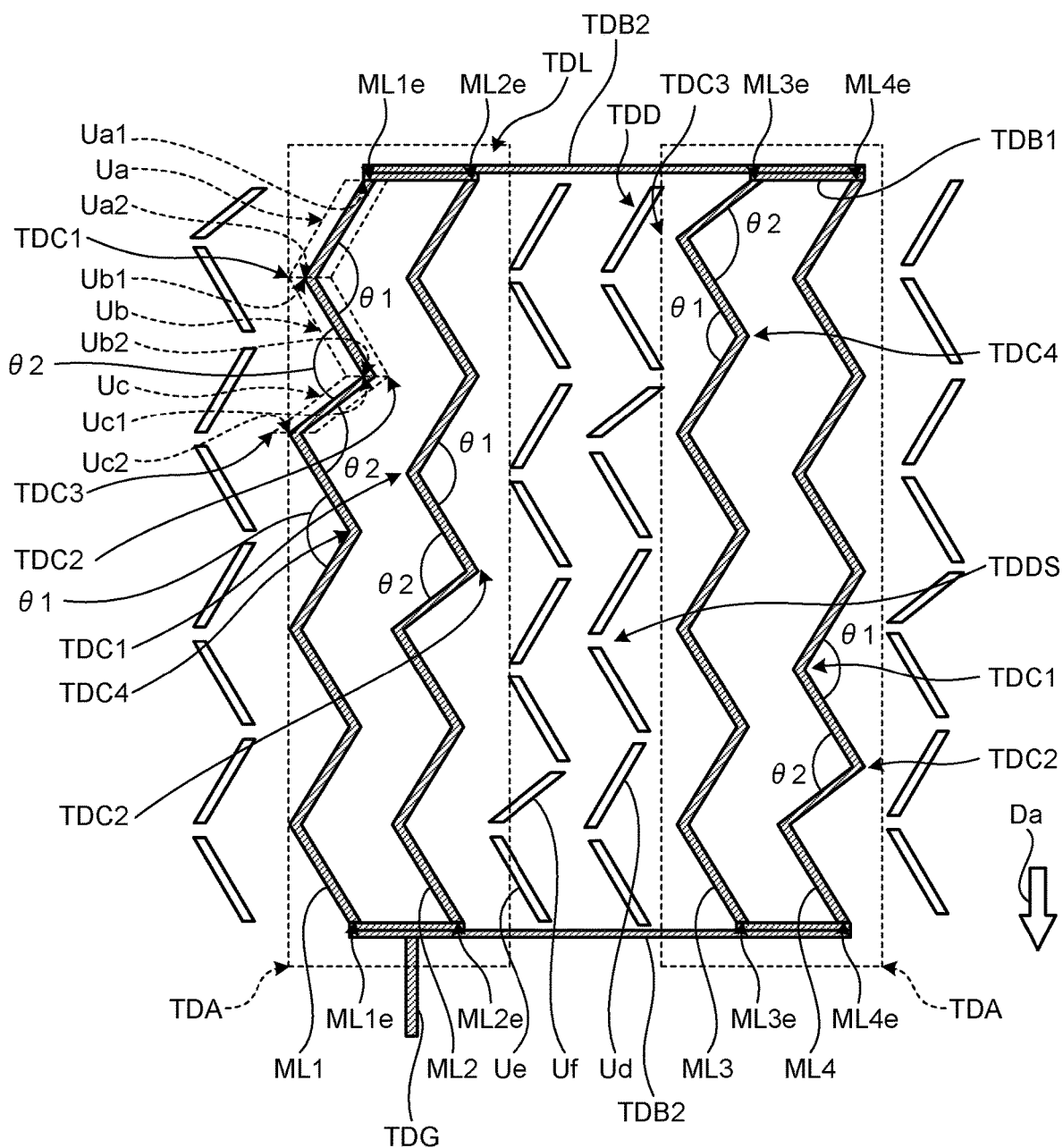
FIG. 13 is a schematic of arrangement of the touch detection electrodes according to the first embodiment.

FIG. 13 is a schematic of arrangement of the touch detection electrode TDL according to the first embodiment. As illustrated in FIG. 13, the touch detection electrode TDL according to the first embodiment includes a plurality of conductive thin wires ML1, ML2, ML3, and ML4 extending in a direction Da on a plane parallel to the counter substrate 3 in an overhead view. The conductive thin wires ML1, ML2, ML3, and ML4 are zigzag lines or wavy lines bent at bent portions TDC1, TDC2, TDC3, and TDC4. The conductive thin wires ML1, ML2, ML3, and ML4 are made of the same material. The conductive thin wire ML1 and the conductive thin wire ML2 are coupled to each other at an end ML1e of the conductive thin wire ML1 and an end ML2e of the conductive thin wire ML2 via a first conductive part TDB1, thereby establishing electrical continuity therebetween. The conductive thin wire ML1 and the conductive thin wire ML2 extend in a manner having no part intersecting with each other except for the part coupled to each other at the first conductive part TDB1 and belong to a detection area TDA. The conductive thin wire ML3 and the conductive thin wire ML4 are coupled to each other at an end ML3e of the conductive thin wire ML3 and an end ML4e of the conductive thin wire ML4 via the first conductive part TDB1, thereby establishing electrical continuity therebetween. The conductive thin wire ML3 and the conductive thin wire ML4 extend in a manner having no part intersecting with each other except for the part coupled to each other at the first conductive part TDB1 and belong to the detection area TDA.

A plurality of detection areas TDA extend with a constant gap interposed therebetween. In the detection areas TDA, the respective first conductive parts TDB1 are coupled to each other via a second conductive part TDB2, thereby establishing electrical continuity therebetween. The second conductive part TDB2 is coupled to the touch detecting unit 40 illustrated in FIG. 1 via detection wiring TDG. The first conductive part TDB1 and the second conductive part TDB2 are made of the same material as that of the conductive thin wires ML1, ML2, ML3, and ML4. This configuration can reduce the number of conductive thin wires. In addition, the conductive thin wires ML1, ML2, ML3, and ML4 are used to perform touch detection on a certain area, making it possible to reduce the resistance generated in the touch detection. The detection area TDA may include three or more conductive thin wires or one conductive thin wire.

The conductive thin wire ML1 includes a thin wire piece Ua, a thin wire piece Ub, and a thin wire piece Uc. The conductive thin wire ML1 is formed of the thin wire piece Ua, the thin wire piece Ub, the thin wire piece Uc, the thin wire piece Ub, the thin wire piece Ua, the thin wire piece Ub, the thin wire piece Ua, and the thin wire piece Ub connected in this order from the end ML1e in the direction Da. The directions in which the thin wire piece Ua, the thin wire piece Ub, and the thin wire piece Uc extend are different from one another. The thin wire piece Ua is a pattern made of a conductive material and includes a first end Ua1 and a second end Ua2. The thin wire piece Ub is a pattern made of a conductive material and includes a first end Ub1 and a second end Ub2. The thin wire piece Uc is a pattern made of a conductive material and includes a first end Uc1 and a second end Uc2.

The thin wire piece Ua and the thin wire piece Ub are connected to each other at the second end Ua2 of the thin wire piece Ua and the first end Ub1 of the thin wire piece Ub, thereby establishing electrical continuity therebetween. The connecting portion corresponds to the bent portion TDC1. The thin wire piece Ua and the thin wire piece Ub are connected to each other at the second end Ub2 of the thin wire piece Ub and the first end Ua1 of the thin wire piece Ua, thereby establishing electrical continuity therebetween. The connecting portion corresponds to the bent portion TDC4. An angle θ1 represents the angle formed by the thin wire piece Ua and the thin wire piece Ub at the bent portion TDC1 and the bent portion TDC4.

The thin wire piece Ub and the thin wire piece Uc are connected to each other at the second end Ub2 of the thin wire piece Ub and the first end Uc1 of the thin wire piece Uc, thereby establishing electrical continuity therebetween. The connecting portion corresponds to the bent portion TDC2. The thin wire piece Ub and the thin wire piece Uc are connected to each other at the second end Uc2 of the thin wire piece Uc and the first end Ub1 of the thin wire piece Ub, thereby establishing electrical continuity therebetween. The connecting portion corresponds to the bent portion TDC3. An angle θ2 represents the angle formed by the thin wire piece Ub and the thin wire piece Uc at the bent portion TDC2 and the bent portion TDC3.

Because the thin wire piece Ua, the thin wire piece Ub, and the thin wire piece Uc extend in different directions, the angle formed by the thin wire piece Ua and the thin wire piece Ub is different from the angle formed by the thin wire piece Ub and the thin wire piece Uc. The magnitude of the angle θ1 is different from that of the angle θ2. In the conductive thin wire ML1, the angle θ1 is different from the angle θ2. The angle θ1 is formed by the thin wire piece Ua and the thin wire piece Ub adjacent to each other at the bent portion TDC1, whereas the angle θ2 is formed by the thin wire piece Ub and the thin wire piece Uc adjacent to each other at the bent portion TDC2 next to the bent portion TDC1.

The conductive thin wire ML2 includes the thin wire piece Ua, the thin wire piece Ub, and the thin wire piece Uc. The conductive thin wire ML2 is formed of the thin wire piece Ua, the thin wire piece Ub, the thin wire piece Ua, the thin wire piece Ub, the thin wire piece Uc, the thin wire piece Ub, the thin wire piece Ua, and the thin wire piece Ub connected in this order from the end ML2e in the direction Da. In other words, if the two ends ML2e are superimposed on the respective two ends ML1e of the conductive thin wire ML1, the conductive thin wire ML2 has a portion not overlapping with the conductive thin wire ML1. The conductive thin wire ML2 has a shape different from that of the conductive thin wire ML1. In the conductive thin wire ML2, the angle θ1 is different from the angle θ2. The angle θ1 is formed by the thin wire piece Ua and the thin wire piece Ub adjacent to each other at the bent portion TDC1, whereas the angle θ2 is formed by the thin wire piece Ub and the thin wire piece Uc adjacent to each other at the bent portion TDC2 next to the bent portion TDC1.

The conductive thin wire ML3 includes the thin wire piece Ua, the thin wire piece Ub, and the thin wire piece Uc. The conductive thin wire ML3 is formed of the thin wire piece Uc, the thin wire piece Ub, the thin wire piece Ua, the thin wire piece Ub, the thin wire piece Ua, the thin wire piece Ub, the thin wire piece Ua, and the thin wire piece Ub connected in this order from the end ML3e in the direction Da. In other words, if the two ends ML3e are superimposed on the respective two ends ML1e of the conductive thin wire ML1, the conductive thin wire ML3 has a portion not overlapping with the conductive thin wire ML1. If the two ends ML3e are superimposed on the respective two ends ML2e of the conductive thin wire ML2, the conductive thin wire ML3 has a portion not overlapping with the conductive thin wire ML2. The conductive thin wire ML3 has a shape different from those of the conductive thin wire ML1 and the conductive thin wire ML2. In the conductive thin wire ML3, the angle θ2 is different from the angle θ1. The angle θ2 is formed by the thin wire piece Uc and the thin wire piece Ub adjacent to each other at the bent portion TDC3, whereas the angle θ1 is formed by the thin wire piece Ub and the thin wire piece Ua adjacent to each other at the bent portion TDC4 next to the bent portion TDC3.

The conductive thin wire ML4 includes the thin wire piece Ua, the thin wire piece Ub, and the thin wire piece Uc. The conductive thin wire ML4 is formed of the thin wire piece Ua, the thin wire piece Ub, the thin wire piece Ua, the thin wire piece Ub, the thin wire piece Ua, the thin wire piece Ub, the thin wire piece Uc, and the thin wire piece Ub connected in this order from the end ML4e in the direction Da. In other words, if the two ends ML4e are superimposed on the respective two ends ML1e of the conductive thin wire ML1, the conductive thin wire ML4 has a portion not overlapping with the conductive thin wire ML1. If the two ends ML4e are superimposed on the respective two ends ML2e of the conductive thin wire ML2, the conductive thin wire ML4 has a portion not overlapping with the conductive thin wire ML2. If the two ends ML4e are superimposed on the respective two ends ML3e of the conductive thin wire ML3, the conductive thin wire ML4 has a portion not overlapping with the conductive thin wire ML3. The conductive thin wire ML4 has a shape different from those of the conductive thin wires ML1, ML2, and ML3. In the conductive thin wire ML4, the angle θ1 is different from the angle θ2. The angle θ1 is formed by the thin wire piece Ua and the thin wire piece Ub adjacent to each other at the bent portion TDC1, whereas the angle θ2 is formed by the thin wire piece Ub and the thin wire piece Uc adjacent to each other at the bent portion TDC2 next to the bent portion TDC1.

The width of the thin wire piece Ua, the thin wire piece Ub, and the thin wire piece Uc preferably falls within a range of 3 μm to 10 μm inclusive. By setting the width of the thin wire piece Ua, the thin wire piece Ub, and the thin wire piece Uc to equal to or smaller than 10 μm, it is possible to reduce the area covering an opening part at which transmission of light is not suppressed by a black matrix or the scanning line GCL and the signal line SGL in the display area Ad. This reduces the possibility to decrease the opening ratio. By setting the width of the thin wire piece Ua, the thin wire piece Ub, and the thin wire piece Uc to equal to or larger than 3 μm, the shapes thereof are stabilized, thereby reducing the possibility that the thin wire piece Ua, the thin wire piece Ub, and the thin wire piece Uc are broken. In the case where the width of the thin wire piece Ua, the thin wire piece Ub, and the thin wire piece Uc is smaller than 3 μm, the bent portions of the conductive thin wires adjacent to each other are preferably connected, thereby establishing electrical continuity therebetween as a measure against breaking of the wires as in a second embodiment, which will be described later.

The conductive thin wire ML1, for example, may include no thin wire piece Uc as long as the conductive thin wires ML1, ML2, ML3, and ML4 have shapes different from one another. The conductive thin wires ML1, ML2, ML3, and ML4 may have the same shape as long as the conductive thin wires ML1, ML2, ML3, and ML4 each include a thin wire piece Ua, a thin wire piece Ub, and a thin wire piece Uc.

The conductive thin wires ML1, ML2, ML3, and ML4 of the touch detection electrode TDL are made of a conductive metal material, specifically, a metal material of aluminum (Al), copper (Cu), silver (Ag), molybdenum (Mo), chromium (Cr), and tungsten (W), and alloys of these. Alternatively, the conductive thin wires ML1, ML2, ML3, and ML4 of the touch detection electrode TDL are made of aluminum (Al), copper (Cu), silver (Ag), molybdenum (Mo), chromium (Cr), and tungsten (W), and oxides (a metal oxide) of these and has conductivity. The conductive thin wires ML1, ML2, ML3, and ML4 may be obtained by patterning a laminated body in which at least one of the metal material and the metal oxide described above is laminated. Alternatively, the conductive thin wires ML1, ML2, ML3, and ML4 may be obtained by patterning a laminated body in which at least one of the metal material, the metal oxide described above and a translucent conductive oxide, such as an indium tin oxide (ITO), serving as a material of a translucent electrode is laminated. The conductive thin wires ML1, ML2, ML3, and ML4 have resistance lower than that of a translucent conductive oxide, such as an ITO, serving as a material of a translucent electrode. The material of the conductive thin wires ML1, ML2, ML3, and ML4 have transmittance lower than that of an ITO in the same film thickness. The material of the conductive thin wires ML1, ML2, ML3, and ML4 may have transmittance of equal to or lower than 10%, for example.

As illustrated in FIG. 13, the detection areas TDA are arranged with the constant gap interposed therebetween. An area in which the conductive thin wires ML1, ML2, ML3, and ML4 are arranged in the touch detection electrode TDL is different in the light-shielding property from an area in which no conductive thin wires ML1, ML2, ML3, and ML4 are arranged in the touch detection electrode TDL. This may possibly make the touch detection electrode TDL easy to visually recognize. To address this, the dummy electrode TDD not connected to the detection wiring TDG is arranged between the detection areas TDA adjacent to each other on the counter substrate 3. The dummy electrode TDD is made of the same material as that of the conductive thin wires ML1, ML2, ML3, and ML4 of the touch detection electrode TDL. The dummy electrode TDD may be made of a different material as long as the dummy electrode TDD has substantially the same light-shielding property as that of the touch detection electrode TDL.

The dummy electrode TDD illustrated in FIG. 13 includes a thin wire piece Ud, a thin wire piece Ue, and a thin wire piece Uf. The direction in which the thin wire piece Ud according to the first embodiment extends is parallel to the direction in which the thin wire piece Ua according to the first embodiment extends, for example. The direction in which the thin wire piece Ue according to the first embodiment extends is parallel to the direction in which the thin wire piece Ub according to the first embodiment extends, for example. The direction in which the thin wire piece Uf according to the first embodiment extends is parallel to the direction in which the thin wire piece Uc according to the first embodiment extends, for example. The thin wire piece Ud, the thin wire piece Ue, and the thin wire piece Uf are arranged such that the number of thin wire pieces Ua, Ub, and Uc per unit area in the detection area TDA is nearly the same as the number of thin wire pieces Ud, Ue, and Uf per unit area in the area other than the detection area TDA. A part of the dummy electrode TDD according to the first embodiment is formed of the thin wire piece Ud, the thin wire piece Ue, the thin wire piece Uf, the thin wire piece Ue, the thin wire piece Ud, the thin wire piece Ue, the thin wire piece Ud, and the thin wire piece Ue arranged in this order in the direction Da, for example. In other words, the dummy electrode TDD has a portion overlapping with the conductive thin wire ML1. This configuration reduces difference in the light-shielding property between the area in which the touch detection electrode TDL is arranged and the area in which no touch detection electrode TDL is arranged. This can reduce the possibility that the touch detection electrode TDL is visually recognized.

The dummy electrode TDD has dividing portions TDDS serving as slits in which the same material as that of the conductive thin wires ML1, ML2, ML3, and ML4 is not provided between the thin wire piece Ud and the thin wire piece Ue and between the thin wire piece Ue and the thin wire piece Uf. The dividing portions TDDS prevent electrical continuity between the thin wire piece Ud and the thin wire piece Ue and between the thin wire piece Ue and the thin wire piece Uf, thereby generating a difference in capacitance between the dummy electrode and the touch detection electrode. If a finger is in proximity with both the touch detection electrode TDL and the dummy electrode TDD in touch detection, this configuration can reduce an influence caused by the dummy electrode TDD on the absolute value $|\Delta V|$ illustrated in FIG. 6. The dummy electrode TDD includes the dividing portions TDDS, thereby generating a difference in capacitance between the dummy electrode TDD and the touch detection electrode TDL. This can reduce an influence on touch detection accuracy.

1-1C. Advantages

As described above, the pixels Pix are arranged in a matrix along a direction parallel to the scanning line GCL and a direction parallel to the signal line SGL. If the scanning line GCL and the signal line SGL are covered with a black matrix, the black matrix suppresses transmission of light. If the scanning line GCL and the signal line SGL are not covered with black matrix, the scanning line GCL and the signal line SGL suppress transmission of light. In the first embodiment, a periodic pattern of a plurality of lines extending along a direction parallel to the scanning line GCL is likely to appear on the display area Ad. A periodic pattern of a plurality of lines extending along a direction parallel to the signal line SGL is also likely to appear on the display area Ad. If the touch detection electrode TDL is laminated in a direction perpendicular to the surface of the display area Ad, the patterns appearing on the display area Ad interfere with the touch detection electrode TDL. This may possibly form a light and dark pattern, thereby causing moire to be visually recognized.

In the display device 1 with a touch detecting function according to the first embodiment, the shape of the conductive thin wire ML1 is different from that of the conductive thin wire ML2 adjacent thereto, and the shape of the conductive thin wire ML3 is different from that of the conductive thin wire ML4 adjacent thereto. Thus, the angle formed by the conductive thin wires ML1, ML2, ML3, and ML4 and the pattern appearing on the display area Ad varies depending on the position. As a result, the display device 1 with a touch detecting function according to the first embodiment keeps the light and dark pattern described above from having a constant period. This can reduce the possibility that moire is visually recognized.

In the display device 1 with a touch detecting function according to the first embodiment, the shape formed by combining the conductive thin wire ML1 and the conductive thin wire ML2 through the first conductive part TDB1 is different from that formed by combining the conductive thin wire ML3 and the conductive thin wire ML4 through the first conductive part TDB1. Thus, the angle formed by the conductive thin wires ML1, ML2, ML3, and ML4 and the pattern appearing on the display area Ad varies depending on the position. As a result, the display device 1 with a touch detecting function according to the first embodiment keeps the light and dark pattern described above from having a constant period. This can reduce the possibility that moire is visually recognized.

In the display device 1 with a touch detecting function according to the first embodiment, the angle $\theta 1$ is different from the angle $\theta 2$ in the conductive thin wires ML1, ML2, ML3, and ML4. The angle $\theta 1$ is formed by the thin wire piece Ua and the thin wire piece Ub adjacent to each other at the bent portion TDC1 or the bent portion TDC4, whereas the angle θ2 is formed by the thin wire piece Ub and the thin wire piece Uc adjacent to each other at the bent portion TDC2 or the bent portion TDC3 next to the bent portions. Thus, the angle formed by the conductive thin wires ML1, ML2, ML3, and ML4 and the pattern appearing on the display area Ad varies depending on the position. As a result, the display device 1 with a touch detecting function according to the first embodiment keeps the light and dark pattern described above from having a constant period. This can reduce the possibility that moire is visually recognized.

1-1D. First Modification of the First Embodiment

Figure 14:
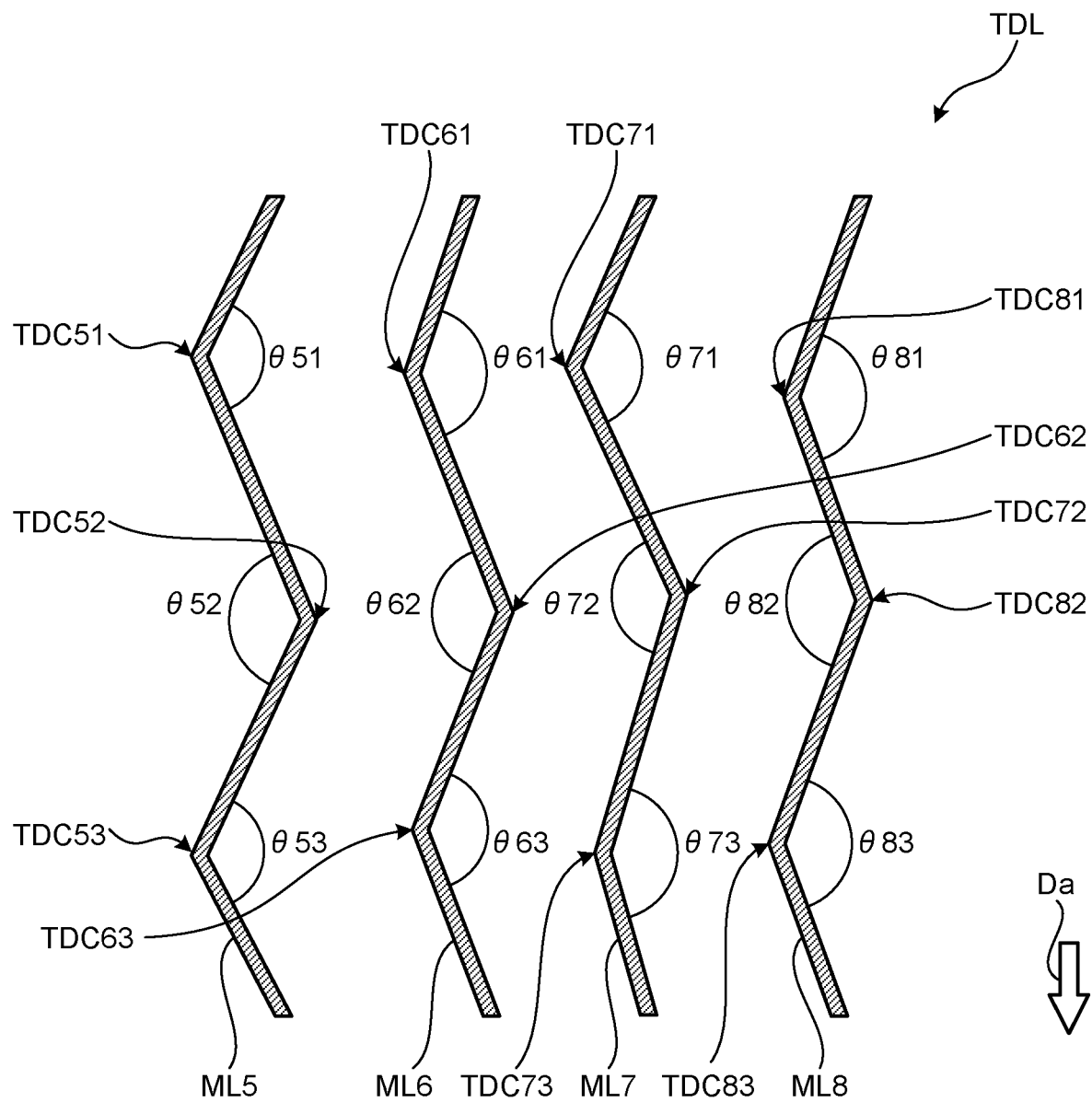
FIG. 14 is a schematic of partial arrangement of a touch detection electrode according to a first modification of the first embodiment.

FIG. 14 is a schematic of a part of arrangement of the touch detection electrode TDL according to a first modification of the first embodiment. The touch detection electrode TDL according to the first modification of the first embodiment includes conductive thin wires ML5, ML6, ML7, and ML8 extending in a manner having no part intersecting with one another on a plane parallel to the counter substrate 3. The conductive thin wires ML5, ML6, ML7, and ML8 are zigzag lines or wavy lines bent at bent portions. The conductive thin wires ML5, ML6, ML7, and ML8 are made of the same material. The conductive thin wires ML5, ML6, ML7, and ML8 have shapes different from one another. The conductive thin wires ML5, ML6, ML7, and ML8 are each formed of a plurality of thin wire pieces extending in different directions. While the first modification of the first embodiment illustrates no dummy electrode TDD for explanation, the dummy electrode TDD may be provided. Components similar to those of the first embodiment are denoted by the same reference numerals, and a duplicate explanation thereof will be omitted.

The following describes a part of the conductive thin wire ML5. The angle formed by the thin wire pieces adjacent to each other at a bent portion TDC51 is an angle θ51. The angle formed by the thin wire pieces adjacent to each other at a bent portion TDC52 next to the bent portion TDC51 is an angle θ52. The angle formed by the thin wire pieces adjacent to each other at a bent portion TDC53 next to the bent portion TDC52 is an angle θ53. Because the conductive thin wire ML5 is formed only of the thin wire pieces extending in different directions, the angle θ51, the angle θ52, and the angle θ53 are different from one another.

The following describes a part of the conductive thin wire ML6. The angle formed by the thin wire pieces adjacent to each other at a bent portion TDC61 is an angle θ61. The angle formed by the thin wire pieces adjacent to each other at a bent portion TDC62 next to the bent portion TDC61 is an angle θ62. The angle formed by the thin wire pieces adjacent to each other at a bent portion TDC63 next to the bent portion TDC62 is an angle θ63. Because the conductive thin wire ML6 is formed only of the thin wire pieces extending in different directions, the angle θ61, the angle θ62, and the angle θ63 are different from one another.

The following describes a part of the conductive thin wire ML7. The angle formed by the thin wire pieces adjacent to each other at a bent portion TDC71 is an angle θ71. The angle formed by the thin wire pieces adjacent to each other at a bent portion TDC72 next to the bent portion TDC71 is an angle θ72. The angle formed by the thin wire pieces adjacent to each other at a bent portion TDC73 next to the bent portion TDC72 is an angle θ73. Because the conductive thin wire ML7 is formed only of the thin wire pieces extending in different directions, the angle θ71, the angle θ72, and the angle θ73 are different from one another.

The following describes a part of the conductive thin wire ML8. The angle formed by the thin wire pieces adjacent to each other at a bent portion TDC81 is an angle θ81. The angle formed by the thin wire pieces adjacent to each other at a bent portion TDC82 next to the bent portion TDC81 is an angle θ82. The angle formed by the thin wire pieces adjacent to each other at a bent portion TDC83 next to the bent portion TDC82 is an angle θ83. Because the conductive thin wire ML8 is formed only of the thin wire pieces extending in different directions, the angle θ81, the angle θ82, and the angle θ83 are different from one another.

The difference between the angle θ51 and the angle θ52 and the difference between the angle θ52 and the angle θ53 are preferably 0 degree to 15 degrees inclusive. The difference between the angle θ61 and the angle θ62 and the difference between the angle θ62 and the angle θ63 are preferably 0 degree to 15 degrees inclusive. The difference between the angle θ71 and the angle θ72 and the difference between the angle θ72 and the angle θ73 are preferably 0 degree to 15 degrees inclusive. The difference between the angle θ81 and the angle θ82 and the difference between the angle θ82 and the angle θ83 are preferably 0 degree to 15 degrees inclusive.

1-1E. Advantages

In the touch detection electrode TDL according to the first modification of the first embodiment, the conductive thin wires ML5, ML6, ML7, and ML8 have shapes different from one another. Thus, the angle formed by the conductive thin wires ML5, ML6, ML7, and ML8 and the pattern appearing on the display area Ad varies depending on the position. As a result, the touch detection electrode TDL according to the first modification of the first embodiment keeps the light and dark pattern described above from having a constant period. This can reduce the possibility that moire is visually recognized.

In the touch detection electrode TDL according to the first modification of the first embodiment, the angles formed by the thin wire pieces adjacent to each other at the bent portions are different from one another in the conductive thin wires ML5, ML6, ML7, and ML8. Thus, the angle formed by the conductive thin wires ML5, ML6, ML7, and ML8 and the pattern appearing on the display area Ad varies depending on the position. As a result, the touch detection electrode TDL according to the first modification of the first embodiment keeps the light and dark pattern described above from having a constant period. This can reduce the possibility that moire is visually recognized.

BY setting the difference between the angle θ51 and the angle θ52 and the difference between the angle θ52 and the angle θ53 to 0 degree to 15 degrees inclusive, for example, it is possible to facilitate the maintenance of the uniformity of the luminance in the display area Ad. As a result, the touch detection electrode TDL according to the first modification of the first embodiment can reduce the possibility that what is called roughness on the display area Ad is visually recognized.

1-1F. Second Modification of the First Embodiment

Figure 15:
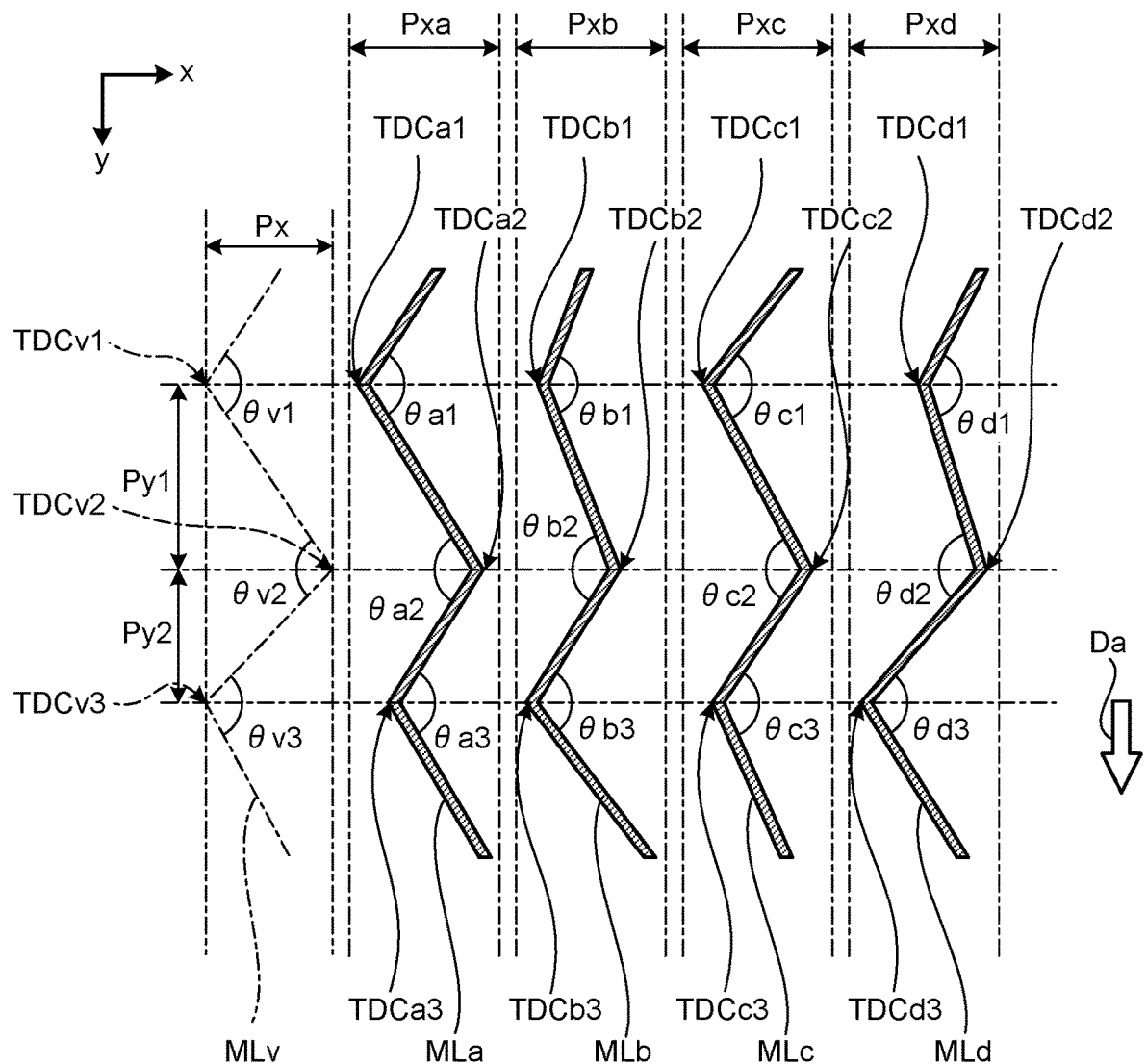
FIG. 15 is a schematic of partial arrangement of a touch detection electrode according to a second modification of the first embodiment.

FIG. 15 is a schematic of a part of arrangement of the touch detection electrode TDL according to a second modification of the first embodiment. The touch detection electrode TDL according to the second modification of the first embodiment includes conductive thin wires MLa, MLb, MLc, and MLd extending in a manner having no part intersecting with one another on a plane parallel to the counter substrate 3. The conductive thin wires MLa, MLb, MLc, and MLd are zigzag lines or wavy lines bent at bent portions. The conductive thin wires MLa, MLb, MLc, and MLd are made of the same material. The conductive thin wires MLa, MLb, MLc, and MLd have the positions of the bent portions aligned in the direction Da but have shapes different from one another. The conductive thin wires MLa, MLb, MLc, and MLd are each formed of a plurality of thin wire pieces extending in different directions. While the second modification of the first embodiment illustrates no dummy electrode TDD for explanation, the dummy electrode TDD may be provided. Components similar to those of the first embodiment are denoted by the same reference numerals, and a duplicate explanation thereof will be omitted.

The shapes of the conductive thin wires MLa, MLb, MLc, and MLd are determined based on a virtual conductive thin wire MLv. The virtual conductive thin wire MLv is assumed to extend in the direction Da on a plane parallel to the counter substrate 3. In the description below, x-y coordinates are assumed to be set on the plane parallel to the counter substrate 3 for explanation. The y-direction in the x-y coordinates is parallel to the direction Da. The x-direction in the x-y coordinates is a direction orthogonal to the direction Da.

The virtual conductive thin wire MLv is formed of thin wire pieces extending in different directions. The deviations between the respective bent portions in the x-direction in the virtual conductive thin wire MLv are constant, and the length thereof is a length Px. The deviations between the respective bent portions in the y-direction in the virtual conductive thin wire MLv include at least a length Py1 and a length Py2, which are different from each other. The virtual conductive thin wire MLv includes a bent portion TDCv1, a bent portion TDCv2, and a bent portion TDCv3, for example. The bent portion TDCv2 is next to the bent portion TDCv1. The bent portion TDCv3 is next to the bent portion TDCv2. The deviation between the bent portion TDCv1 and the bent portion TDCv2 in the y-direction is the length Py1. The deviation between the bent portion TDCv2 and the bent portion TDCv3 in the y-direction is the length Py2.

The angle formed by the thin wire pieces adjacent to each other at the bent portion TDCv1 is an angle θv1. The angle formed by the thin wire pieces adjacent to each other at the bent portion TDCv2 next to the bent portion TDCv1 is an angle θv2. The angle formed by the thin wire pieces adjacent to each other at the bent portion TDCv3 next to the bent portion TDCv2 is an angle θv3. Because the virtual conductive thin wire MLv is formed only of the thin wire pieces extending in different directions, the angle θv1, the angle θv2, and the angle θv3 are different from one another.

The number of thin wire pieces included in each of the conductive thin wires MLa, MLb, MLc, and MLd is the same as that of thin wire pieces included in the virtual conductive thin wire MLv. In other words, the number of bent portions included in each of the conductive thin wires MLa, MLb, MLc, and MLd is the same as that of bent portions included in the virtual conductive thin wire MLv. The positions of the bent portions in the y-direction in the conductive thin wires MLa, MLb, MLc, and MLd are the same as those of the bent portions in the y-direction in the virtual conductive thin wire MLv.

The position of a bent portion TDCa1 in the y-direction in the conductive thin wire MLa is the same as that of the bent portion TDCv1 in the y-direction in the virtual conductive thin wire MLv. The position of a bent portion TDCa2 next to the bent portion TDCa1 in the y-direction is the same as that of the bent portion TDCv2 in the y-direction in the virtual conductive thin wire MLv. The position of a bent portion TDCa3 next to the bent portion TDCa2 in the y-direction is the same as that of the bent portion TDCv3 in the y-direction in the virtual conductive thin wire MLv. The deviation in the x-direction between the bent portions farthest away from each other in the x-direction in the conductive thin wire MLa is equal to or smaller than a length Pxa.

The angle formed by the thin wire pieces adjacent to each other at the bent portion TDCa1 is an angle θa1. The angle formed by the thin wire pieces adjacent to each other at the bent portion TDCa2 next to the bent portion TDCa1 is an angle θa2. The angle formed by the thin wire pieces adjacent to each other at the bent portion TDCa3 next to the bent portion TDCa2 is an angle θa3. Because the conductive thin wire MLa is formed only of the thin wire pieces extending in different directions, the angle θa1, the angle θa2, and the angle θa3 are different from one another.

The position of a bent portion TDCb1 in the y-direction in the conductive thin wire MLb is the same as that of the bent portion TDCv1 in the y-direction in the virtual conductive thin wire MLv. The position of a bent portion TDCb2 next to the bent portion TDCb1 in the y-direction is the same as that of the bent portion TDCv2 in the y-direction in the virtual conductive thin wire MLv. The position of a bent portion TDCb3 next to the bent portion TDCb2 in the y-direction is the same as that of the bent portion TDCv3 in the y-direction in the virtual conductive thin wire MLv. The deviation in the x-direction between the bent portions farthest away from each other in the x-direction in the conductive thin wire MLb is equal to or smaller than a length Pxb.

The angle formed by the thin wire pieces adjacent to each other at the bent portion TDCb1 is an angle θb1. The angle formed by the thin wire pieces adjacent to each other at the bent portion TDCb2 next to the bent portion TDCb1 is an angle θb2. The angle formed by the thin wire pieces adjacent to each other at the bent portion TDCb3 next to the bent portion TDCb2 is an angle θb3. Because the conductive thin wire MLb is formed only of the thin wire pieces extending in different directions, the angle θb1, the angle θb2, and the angle θb3 are different from one another.

The position of a bent portion TDCc1 in the y-direction in the conductive thin wire MLc is the same as that of the bent portion TDCv1 in the y-direction in the virtual conductive thin wire MLv. The position of a bent portion TDCc2 next to the bent portion TDCc1 in the y-direction is the same as that of the bent portion TDCv2 in the y-direction in the virtual conductive thin wire MLv. The position of a bent portion TDCc3 next to the bent portion TDCc2 in the y-direction is the same as that of the bent portion TDCv3 in the y-direction in the virtual conductive thin wire MLv. The deviation in the x-direction between the bent portions farthest away from each other in the x-direction in the conductive thin wire MLc is equal to or smaller than a length Pxc.

The angle formed by the thin wire pieces adjacent to each other at the bent portion TDCc1 is an angle θc1. The angle formed by the thin wire pieces adjacent to each other at the bent portion TDCc2 next to the bent portion TDCc1 is an angle θc2. The angle formed by the thin wire pieces adjacent to each other at the bent portion TDCc3 next to the bent portion TDCc2 is an angle θc3. Because the conductive thin wire MLc is formed only of the thin wire pieces extending in different directions, the angle θc1, the angle θc2, and the angle θc3 are different from one another.

The position of a bent portion TDCd1 in the y-direction in the conductive thin wire MLd is the same as that of the bent portion TDCv1 in the y-direction in the virtual conductive thin wire MLv. The position of a bent portion TDCd2 next to the bent portion TDCd1 in the y-direction is the same as that of the bent portion TDCv2 in the y-direction in the virtual conductive thin wire MLv. The position of a bent portion TDCd3 next to the bent portion TDCd2 in the y-direction is the same as that of the bent portion TDCv3 in the y-direction in the virtual conductive thin wire MLv. The deviation in the x-direction between the bent portions farthest away from each other in the x-direction in the conductive thin wire MLd is equal to or smaller than a length Pxd.

The angle formed by the thin wire pieces adjacent to each other at the bent portion TDCd1 is an angle θd1. The angle formed by the thin wire pieces adjacent to each other at the bent portion TDCd2 next to the bent portion TDCd1 is an angle θd2. The angle formed by the thin wire pieces adjacent to each other at the bent portion TDCd3 next to the bent portion TDCd2 is an angle θd3. Because the conductive thin wire MLd is formed only of the thin wire pieces extending in different directions, the angle θd1, the angle θd2, and the angle θd3 are different from one another.

The lengths Px, Pxa, Pxb, Pxc, and Pxd are preferably 40 μm to 300 μm inclusive. By setting the lengths Px, Pxa, Pxb, Pxc, and Pxd to equal to or smaller than 300 μm, the touch detection electrode TDL is made hard to visually recognize with human eyes. In addition, it is possible to reduce the area covering an opening part at which transmission of light is not suppressed by a black matrix or the scanning line GCL and the signal line SGL in the display area Ad. This reduces the possibility to decrease the opening ratio. By setting the lengths Px, Pxa, Pxb, Pxc, and Pxd to equal to or larger than 40 μm, it is possible to increase the range of choice of the magnitude of the angles θa1, θb1, θc1, and θd1, for example.

The lengths Px, Pxa, Pxb, Pxc, and Pxd are more preferably equal to or smaller than 200 μm. By setting the lengths Px, Pxa, Pxb, Pxc, and Pxd to equal to or smaller than 200 μm, the touch detection electrode TDL is made harder to visually recognize with human eyes than the case of 300 μm. In addition, it is possible to reduce the loss of the opening ratio to an extent not to hinder visual recognition.

The lengths Px, Pxa, Pxb, Pxc, and Pxd are still more preferably equal to or smaller than 100 μm. By setting the lengths Px, Pxa, Pxb, Pxc, and Pxd to equal to or smaller than 100 μm, the touch detection electrode TDL is made harder to visually recognize with human eyes than the case of 200 μm. In addition, it is possible to reduce the loss of the opening ratio to an extent not to hinder visual recognition.

A plurality of virtual conductive thin wires in which at least one of the angle θv1, the angle θv2, and the angle θv3 is different may be provided. In the case where a plurality of virtual conductive thin wires MLv are provided, the shapes of the conductive thin wires MLa, MLb, MLc, and MLd are, for example, determined based on the virtual conductive thin wires in which at least one of the angle θv1, the angle θv2, and the angle θv3 is different. In this case, the positions of the bent portions in the y-direction in the conductive thin wires MLa, MLb, MLc, and MLd are deviated. Thus, the arrangement of the touch detection electrode TDL may be the same as the arrangement of the conductive thin wires ML5, ML6, ML7, and ML8 of the first modification of the first embodiment.

1-1G. Advantages

In the touch detection electrode TDL according to the second modification of the first embodiment, the conductive thin wires MLa, MLb, MLc, and MLd have shapes different from one another. Thus, the angle formed by the conductive thin wires MLa, MLb, MLc, and MLd and the pattern appearing on the display area Ad varies depending on the position. As a result, the touch detection electrode TDL according to the second modification of the first embodiment keeps the light and dark pattern described above from having a constant period. This can reduce the possibility that moire is visually recognized.

In the touch detection electrode TDL according to the second modification of the first embodiment, the angles formed by the thin wire pieces adjacent to each other at the bent portions are different from one another in the conductive thin wires MLa, MLb, MLc, and MLd. Thus, the angle formed by the conductive thin wires MLa, MLb, MLc, and MLd and the pattern appearing on the display area Ad varies depending on the position. As a result, the touch detection electrode TDL according to the second modification of the first embodiment keeps the light and dark pattern described above from having a constant period. This can reduce the possibility that moire is visually recognized.

In the conductive thin wires MLa, MLb, MLc, and MLd, the positions of the bent portions in the y-direction are aligned. This facilitates the maintenance of the uniformity of the luminance in the display area Ad. As a result, the touch detection electrode TDL according to the second modification of the first embodiment can reduce the possibility that what is called roughness on the display area Ad is visually recognized.

By setting the lengths Px, Pxa, Pxb, Pxc, and Pxd to 40 μm to 300 μm inclusive, it is possible to further facilitate the maintenance of the uniformity of the luminance in the display area Ad. As a result, the touch detection electrode TDL according to the second modification of the first embodiment can reduce the possibility that what is called roughness on the display area Ad is visually recognized.

1-1H. Third Modification of the First Embodiment

Figure 16:
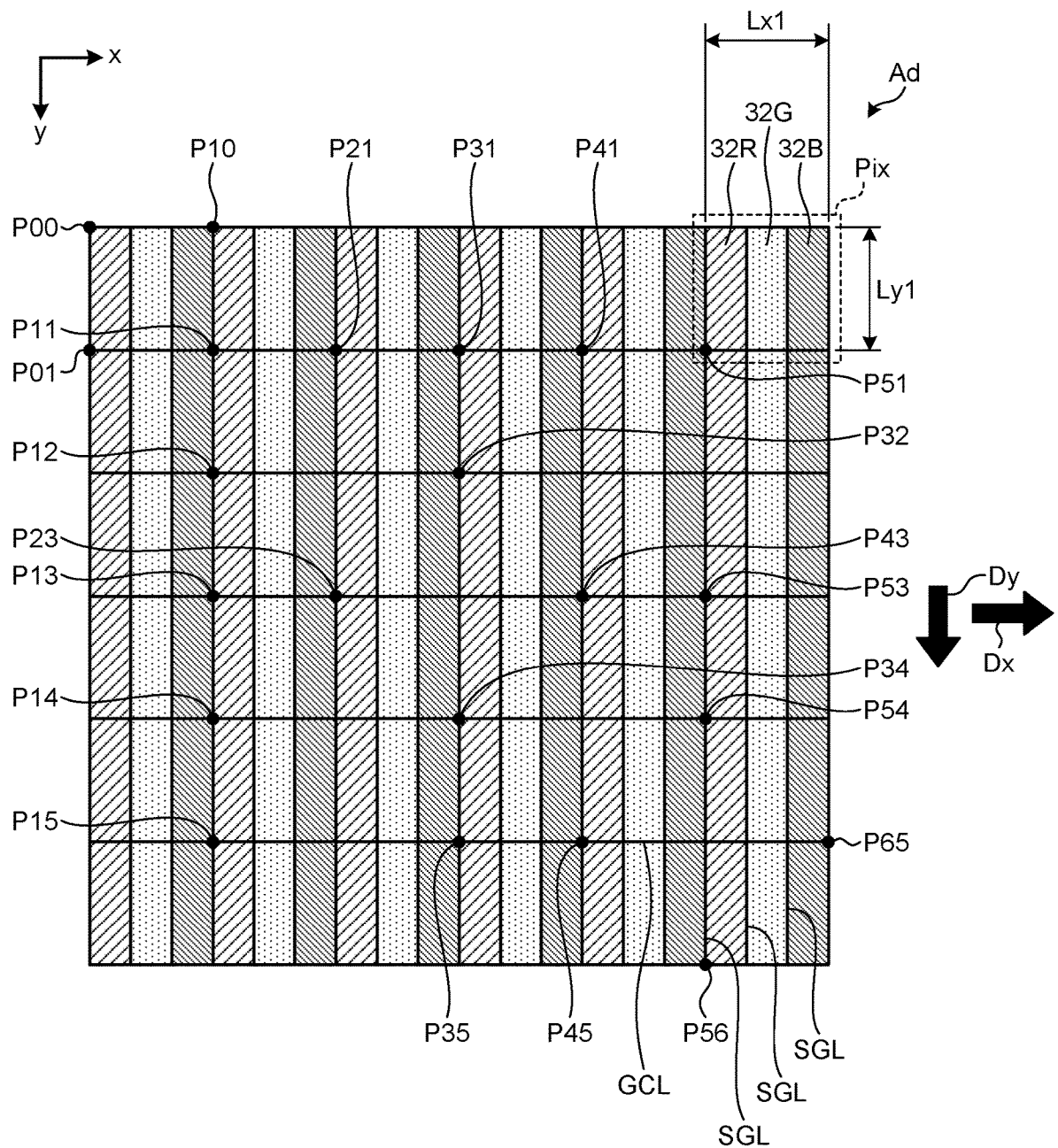
FIG. 16 is a schematic for explaining the relative positional relation between a first end and a second end of a thin wire piece according to a third modification of the first embodiment.

FIG. 16 is a schematic for explaining the relative positional relation between the first end and the second end of the thin wire piece according to a third modification of the first embodiment. The touch detection electrode TDL according to the third modification of the first embodiment is the touch detection electrode TDL illustrated in FIG. 13, where the directions in which the thin wire piece Ua, the thin wire piece Ub, and the thin wire piece Uc extend are determined by the array of the pixels Pix. Specifically, the directions in which the thin wire piece Ua, the thin wire piece Ub, and the thin wire piece Uc extend are determined by the angle with respect to a pixel array direction Dy illustrated in FIG. 16. The direction Da in which the touch detection electrode TDL extends is parallel to the pixel array direction Dy illustrated in FIG. 16.

The following describes the pixel array direction Dy and the pixel orthogonal direction Dx illustrated in FIG. 16. As described above, the display area Ad includes a plurality of pixels Pix each formed of a group of the color areas 32R, 32G, and 32B associated with the respective sub-pixels SPix. The pixels Pix are arranged in a matrix along a direction parallel to the scanning line GCL and a direction parallel to the signal line SGL. The pixels Pix are arranged such that the color areas 32R, 32G, and 32B and the color areas 32R, 32G, and 32B adjacent thereto, respectively, are arranged side by side with the scanning line GCL interposed therebetween.

The pixel array direction Dy is a direction in which the color areas having the highest human visibility are aligned. The pixel orthogonal direction Dx is a direction orthogonal to the pixel array direction Dy on a plane parallel to the surface of the counter substrate 3. G (green) has the highest human visibility of the three colors of R (red), G (green), and B (blue). Because the color areas 32G are aligned in a direction parallel to the signal line SGL in FIG. 16, the pixel array direction Dy according to the third modification of the first embodiment corresponds to the direction parallel to the signal line SGL. In a modification where W (white) is added and four colors of R (red), G (green), B (blue), and W (white) are used, W (white) has the highest human visibility.

To explain the relative positional relation between the first end Ub1 and the second end Ub2 of the thin wire piece Ub, for example, x-y coordinates are set in FIG. 16. In the x-y coordinates, an origin P00 is set at an arbitrary point among the intersections of the scanning lines GCL and the signal lines SGL, and (0,0) represents the coordinates of the origin P00. The x-axis is set in a direction parallel to the pixel orthogonal direction Dx, whereas the y-axis is set in a direction parallel to the pixel array direction Dy. The maximum length of one pixel Pix in the x-direction is determined to be a unit length in the x-direction, whereas the maximum length of one pixel Pix in the y-direction is determined to be a unit length in the y-direction. The maximum length of one pixel Pix in the x-direction is a first unit length Lx1, whereas the maximum length of one pixel Pix in the y-direction is a second unit length Ly1. The ratio of the first unit length Lx1 to the second unit length Ly1 according to the third modification of the first embodiment is 1 to 1, for example.

The coordinates of a point moving forward in the x-direction by the first unit length Lx1 from the origin P00 and further moving forward in the y-direction by the second unit length Ly1 are represented by (1,1), for example. In the x-y coordinates, a point P01 is a point whose coordinates are (0,1). A point P15 is a point whose coordinates are (1,5). A point P14 is a point whose coordinates are (1,4). A point P13 is a point whose coordinates are (1,3). A point P12 is a point whose coordinates are (1,2). A point P35 is a point whose coordinates are (3,5). A point P23 is a point whose coordinates are (2,3). A point P34 is a point whose coordinates are (3,4). A point P45 is a point whose coordinates are (4,5). A point P56 is a point whose coordinates are (5,6). A point P11 is a point whose coordinates are (1,1). A point P65 is a point whose coordinates are (6,5). A point P54 is a point whose coordinates are (5,4). A point P43 is a point whose coordinates are (4,3). A point P32 is a point whose coordinates are (3,2). A point P53 is a point whose coordinates are (5,3). A point P21 is a point whose coordinates are (2,1). A point P31 is a point whose coordinates are (3,1). A point P41 is a point whose coordinates are (4,1). A point P51 is a point whose coordinates are (5,1). A point P10 is a point whose coordinates are (1,0).

Evaluation examples relating to the angle with respect to the pixel array direction Dy Evaluation of visual recognition of moire was made by setting the position of the first end Ub1 of the thin wire piece Ub at the point P00 and changing the direction in which the second end Ub2 is positioned. The following describes the evaluation results with reference to first to twenty-first evaluation examples illustrated in FIG. 17.

First Evaluation Example

In a conductive thin wire according to a first evaluation example, a plurality of thin wire pieces parallel to the pixel array direction Dy are connected in the pixel array direction Dy.

Second Evaluation Example

In a conductive thin wire according to a second evaluation example, the thin wire pieces Ua and the thin wire pieces Ub are connected alternately. If the first end Ub1 of the thin wire piece Ub is positioned at the point P00, the thin wire piece Ub is arranged such that the second end Ub2 is positioned in a direction from the point P00 toward the point P15 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Third Evaluation Example

In a conductive thin wire according to a third evaluation example, the thin wire pieces Ua and the thin wire pieces Ub are connected alternately. If the first end Ub1 of the thin wire piece Ub is positioned at the point P00, the thin wire piece Ub is arranged such that the second end Ub2 is positioned in a direction from the point P00 toward the point P14 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Fourth Evaluation Example

In a conductive thin wire according to a fourth evaluation example, the thin wire pieces Ua and the thin wire pieces Ub are connected alternately. If the first end Ub1 of the thin wire piece Ub is positioned at the point P00, the thin wire piece Ub is arranged such that the second end Ub2 is positioned in a direction from the point P00 toward the point P13 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Fifth Evaluation Example

In a conductive thin wire according to a fifth evaluation example, the thin wire pieces Ua and the thin wire pieces Ub are connected alternately. If the first end Ub1 of the thin wire piece Ub is positioned at the point P00, the thin wire piece Ub is arranged such that the second end Ub2 is positioned in a direction from the point P00 toward the point P12 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Sixth Evaluation Example

In a conductive thin wire according to a sixth evaluation example, the thin wire pieces Ua and the thin wire pieces Ub are connected alternately. If the first end Ub1 of the thin wire piece Ub is positioned at the point P00, the thin wire piece Ub is arranged such that the second end Ub2 is positioned in a direction from the point P00 toward the point P35 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Seventh Evaluation Example

In a conductive thin wire according to a seventh evaluation example, the thin wire pieces Ua and the thin wire pieces Ub are connected alternately. If the first end Ub1 of the thin wire piece Ub is positioned at the point P00, the thin wire piece Ub is arranged such that the second end Ub2 is positioned in a direction from the point P00 toward the point P23 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Eighth Evaluation Example

In a conductive thin wire according to an eighth evaluation example, the thin wire pieces Ua and the thin wire pieces Ub are connected alternately. If the first end Ub1 of the thin wire piece Ub is positioned at the point P00, the thin wire piece Ub is arranged such that the second end Ub2 is positioned in a direction from the point P00 toward the point P34 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Ninth Evaluation Example

In a conductive thin wire according to a ninth evaluation example, the thin wire pieces Ua and the thin wire pieces Ub are connected alternately. If the first end Ub1 of the thin wire piece Ub is positioned at the point P00, the thin wire piece Ub is arranged such that the second end Ub2 is positioned in a direction from the point P00 toward the point P45 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Tenth Evaluation Example

In a conductive thin wire according to a tenth evaluation example, the thin wire pieces Ua and the thin wire pieces Ub are connected alternately. If the first end Ub1 of the thin wire piece Ub is positioned at the point P00, the thin wire piece Ub is arranged such that the second end Ub2 is positioned in a direction from the point P00 toward the point P56 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Eleventh Evaluation Example

In a conductive thin wire according to an eleventh evaluation example, the thin wire pieces Ua and the thin wire pieces Ub are connected alternately. If the first end Ub1 of the thin wire piece Ub is positioned at the point P00, the thin wire piece Ub is arranged such that the second end Ub2 is positioned in a direction from the point P00 toward the point P11 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Twelfth Evaluation Example

In a conductive thin wire according to a twelfth evaluation example, the thin wire pieces Ua and the thin wire pieces Ub are connected alternately. If the first end Ub1 of the thin wire piece Ub is positioned at the point P00, the thin wire piece Ub is arranged such that the second end Ub2 is positioned in a direction from the point P00 toward the point P65 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Thirteenth Evaluation Example

In a conductive thin wire according to a thirteenth evaluation example, the thin wire pieces Ua and the thin wire pieces Ub are connected alternately. If the first end Ub1 of the thin wire piece Ub is positioned at the point P00, the thin wire piece Ub is arranged such that the second end Ub2 is positioned in a direction from the point P00 toward the point P54 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Fourteenth Evaluation Example

In a conductive thin wire according to a fourteenth evaluation example, the thin wire pieces Ua and the thin wire pieces Ub are connected alternately. If the first end Ub1 of the thin wire piece Ub is positioned at the point P00, the thin wire piece Ub is arranged such that the second end Ub2 is positioned in a direction from the point P00 toward the point P43 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Fifteenth Evaluation Example

In a conductive thin wire according to a fifteenth evaluation example, the thin wire pieces Ua and the thin wire pieces Ub are connected alternately. If the first end Ub1 of the thin wire piece Ub is positioned at the point P00, the thin wire piece Ub is arranged such that the second end Ub2 is positioned in a direction from the point P00 toward the point P32 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Sixteenth Evaluation Example

In a conductive thin wire according to a sixteenth evaluation example, the thin wire pieces Ua and the thin wire pieces Ub are connected alternately. If the first end Ub1 of the thin wire piece Ub is positioned at the point P00, the thin wire piece Ub is arranged such that the second end Ub2 is positioned in a direction from the point P00 toward the point P53 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Seventeenth Evaluation Example

In a conductive thin wire according to a seventeenth evaluation example, the thin wire pieces Ua and the thin wire pieces Ub are connected alternately. If the first end Ub1 of the thin wire piece Ub is positioned at the point P00, the thin wire piece Ub is arranged such that the second end Ub2 is positioned in a direction from the point P00 toward the point P21 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Eighteenth Evaluation Example

In a conductive thin wire according to an eighteenth evaluation example, the thin wire pieces Ua and the thin wire pieces Ub are connected alternately. If the first end Ub1 of the thin wire piece Ub is positioned at the point P00, the thin wire piece Ub is arranged such that the second end Ub2 is positioned in a direction from the point P00 toward the point P31 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Nineteenth Evaluation Example

In a conductive thin wire according to a nineteenth evaluation example, the thin wire pieces Ua and the thin wire pieces Ub are connected alternately. If the first end Ub1 of the thin wire piece Ub is positioned at the point P00, the thin wire piece Ub is arranged such that the second end Ub2 is positioned in a direction from the point P00 toward the point P41 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Twentieth Evaluation Example

In a conductive thin wire according to a twentieth evaluation example, the thin wire pieces Ua and the thin wire pieces Ub are connected alternately. If the first end Ub1 of the thin wire piece Ub is positioned at the point P00, the thin wire piece Ub is arranged such that the second end Ub2 is positioned in a direction from the point P00 toward the point P51 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Twenty-First Evaluation Example

In a conductive thin wire according to a twenty-first evaluation example, a plurality of thin wire pieces parallel to the pixel orthogonal direction Dx are connected in the pixel orthogonal direction Dx.

Evaluation

In the moire evaluation, the visibility for human eyes of the moire pattern formed by a display image of the display device 1 with a touch detection function corresponding to each of the first evaluation example to the twenty-first evaluation example is evaluated on a scale of four grades. The scale of four grades for the moire evaluation is as follows. The letter A indicates the case where no moire is visually recognized if the distance between the surface of the display device 1 with a touch detecting function and the human eyes is smaller than 30 cm. The letter B indicates the case where no moire is visually recognized if the distance between the display device 1 with a touch detecting function and the human eyes is equal to or larger than 30 cm. The letter C indicates the case where no moire is visually recognized if the distance between the display device 1 with a touch detecting function and the human eyes is equal to or larger than 60 cm. The letter D indicates the case where moire is visually recognized if the distance between the display device 1 with a touch detecting function and the human eyes is equal to or larger than 60 cm.

The sixth to the tenth evaluation examples and the twelfth to the sixteenth evaluation examples satisfy a first condition. The first condition is that the direction in which the thin wire piece Ub extends forms an angle larger than 27 degrees and smaller than 45 degrees or an angle larger than 45 degrees and smaller than 63 degrees with respect to the pixel array direction Dy. As illustrated in FIG. 17, the sixth to the tenth evaluation examples and the twelfth to the sixteenth evaluation examples are assigned with A, B, and C in the moire evaluation. Thus, the conductive thin wire according to the third modification of the first embodiment satisfying the first condition suppresses visual recognition of moire.

1-1I. Advantages

In the display device 1 with a touch detecting function according to the third modification of the first embodiment, the conductive thin wires ML1, ML2, ML3, and ML4 include the thin wire piece Ub satisfying the first condition. This can make the period of the light and dark pattern short enough not to be visually recognized by a human. The thin wire piece Ub according to the third modification of the first embodiment, for example, extends at an angle with respect to the pixel orthogonal direction Dx and the pixel array direction Dy. If the thin wire piece Ub satisfies the first condition, the angle is made larger than a certain angle. This is likely to shorten the period of the light and dark pattern. In the display device 1 with a touch detecting function according to the third modification of the first embodiment, the conductive thin wires ML1, ML2, ML3, and ML4 include the thin wire piece Ub satisfying the first condition. This can reduce the possibility that moire is visually recognized. If the thin wire piece Ua, the thin wire piece Ub, and the thin wire piece Uc satisfy the first condition, the display device 1 with a touch detecting function according to the third modification of the first embodiment can reduce the possibility that moire is visually recognized.

In the display device 1 with a touch detecting function according to the third modification of the first embodiment, the thin wire piece Ub extends in a direction inclined at an angle with respect to the pixel array direction Dy. The tangent value of the angle is larger than a value obtained by dividing the value of the first unit length Lx1 by a value twice as large as the second unit length Ly1 and smaller than a value obtained by dividing a value twice as large as the first unit length Lx1 by the value of the second unit length Ly1. In addition, the tangent value of the angle is different from a value obtained by dividing the value of the first unit length Lx1 by the value of the second unit length Ly1. Thus, the angle of the direction in which the thin wire piece Ub extends with respect to the pixel orthogonal direction Dx and the pixel array direction Dy is made larger than a certain angle. This is likely to shorten the period of the light and dark pattern. As a result, the display device 1 with a touch detecting function according to the third modification of the first embodiment can reduce the possibility that moire is visually recognized.

1-1J. Fourth Modification of the First Embodiment

Figure 18:
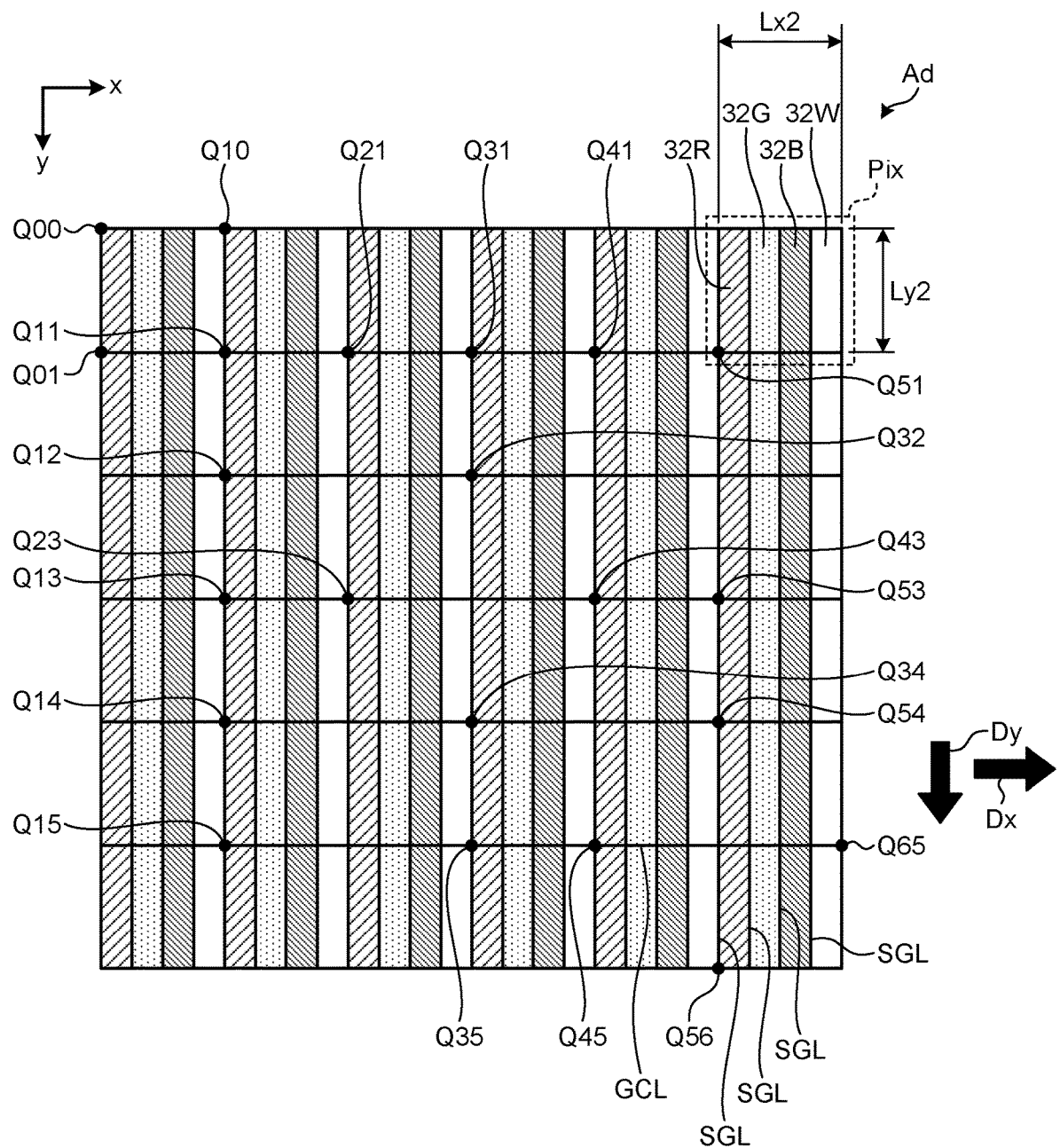
FIG. 18 is a schematic for explaining the relative positional relation between a first end and a second end of a thin wire piece according to a fourth modification of the first embodiment.

FIG. 18 is a schematic for explaining the relative positional relation between the first end and the second end of the thin wire piece according to a fourth modification of the first embodiment. The touch detection electrode TDL according to the fourth modification of the first embodiment is the touch detection electrode TDL illustrated in FIG. 13, where the directions in which the thin wire piece Ua, the thin wire piece Ub, and the thin wire piece Uc extend are determined by the array of the pixels Pix. Specifically, the directions in which the thin wire piece Ua, the thin wire piece Ub, and the thin wire piece Uc extend are determined by the angle with respect to the pixel array direction Dy illustrated in FIG. 18. The direction Da in which the touch detection electrode TDL extends is the same as the pixel array direction Dy illustrated in FIG. 18.

The following describes the pixel array direction Dy and the pixel orthogonal direction Dx illustrated in FIG. 18. As described above, the display area Ad includes a plurality of pixels Pix each formed of a group of the color areas 32R, 32G, 32B, and 32W associated with the respective sub-pixels SPix. The pixels Pix are arranged in a matrix along a direction parallel to the scanning line GCL and a direction parallel to the signal line SGL. The pixels Pix are arranged such that the color areas 32R, 32G, 32B, and 32W and the color areas 32R, 32G, 32B, and 32W adjacent thereto, respectively, are arranged side by side with the scanning line GCL interposed therebetween.

The pixel array direction Dy is a direction in which the color areas having the highest human visibility are aligned. W (white) has the highest human visibility of the four colors of R (red), G (green), B (blue), and W (white). Because the color areas 32W are aligned in a direction parallel to the signal line SGL in FIG. 18, the pixel array direction Dy corresponds to the direction parallel to the signal line SGL.

To explain the relative positional relation between the first end Ub1 and the second end Ub2 of the thin wire piece Ub, for example, x-y coordinates are set in FIG. 18. In the x-y coordinates, an origin Q00 is set at an arbitrary point among the intersections of the scanning lines GCL and the signal lines SGL, and (0,0) represents the coordinates of the origin Q00. The x-axis is set in a direction parallel to the pixel orthogonal direction Dx, whereas the y-axis is set in a direction parallel to the pixel array direction Dy. The maximum length of one pixel Pix in the x-direction is determined to be a unit length in the x-direction, whereas the maximum length of one pixel Pix in the y-direction is determined to be a unit length in the y-direction. The maximum length of one pixel Pix in the x-direction is a first unit length Lx2, whereas the maximum length of one pixel Pix in the y-direction is a second unit length Ly2. The ratio of the first unit length Lx2 to the second unit length Ly2 according to the fourth modification of the first embodiment is 4 to 3, for example.

The coordinates of a point moving forward in the x-direction by the first unit length Lx2 from the origin Q00 and further moving forward in the y-direction by the second unit length Ly2 are represented by (1,1), for example. In the x-y coordinates, a point Q01 is a point whose coordinates are (0,1). A point Q15 is a point whose coordinates are (1,5). A point Q14 is a point whose coordinates are (1,4). A point Q13 is a point whose coordinates are (1,3). A point Q12 is a point whose coordinates are (1,2). A point Q35 is a point whose coordinates are (3,5). A point Q23 is a point whose coordinates are (2,3). A point Q34 is a point whose coordinates are (3,4). A point Q45 is a point whose coordinates are (4,5). A point Q56 is a point whose coordinates are (5,6). A point Q11 is a point whose coordinates are (1,1). A point Q65 is a point whose coordinates are (6,5). A point Q54 is a point whose coordinates are (5,4). A point Q43 is a point whose coordinates are (4,3). A point Q32 is a point whose coordinates are (3,2). A point Q53 is a point whose coordinates are (5,3). A point Q21 is a point whose coordinates are (2,1). A point Q31 is a point whose coordinates are (3,1). A point Q41 is a point whose coordinates are (4,1). A point Q51 is a point whose coordinates are (5,1). A point Q10 is a point whose coordinates are (1,0).

Evaluation examples relating to the angle with respect to the pixel array direction Dy Evaluation of visual recognition of moire was made by setting the position of the first end Ub1 of the thin wire piece Ub at the point Q00 and changing the direction in which the second end Ub2 is positioned. The following describes the evaluation results with reference to twenty-second to forty-second evaluation examples illustrated in FIG. 19.

Twenty-Second Evaluation Example

In a conductive thin wire according to a twenty-second evaluation example, a plurality of thin wire pieces parallel to the pixel array direction Dy are connected in the pixel array direction Dy.

Twenty-Third Evaluation Example

In a conductive thin wire according to a twenty-third evaluation example, the thin wire pieces Ua and the thin wire pieces Ub are connected alternately. If the first end Ub1 of the thin wire piece Ub is positioned at the point Q00, the thin wire piece Ub is arranged such that the second end Ub2 is positioned in a direction from the point Q00 toward the point Q15 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Twenty-Fourth Evaluation Example

In a conductive thin wire according to a twenty-fourth evaluation example, the thin wire pieces Ua and the thin wire pieces Ub are connected alternately. If the first end Ub1 of the thin wire piece Ub is positioned at the point Q00, the thin wire piece Ub is arranged such that the second end Ub2 is positioned in a direction from the point Q00 toward the point Q14 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Twenty-Fifth Evaluation Example

In a conductive thin wire according to a twenty-fifth evaluation example, the thin wire pieces Ua and the thin wire pieces Ub are connected alternately. If the first end Ub1 of the thin wire piece Ub is positioned at the point Q00, the thin wire piece Ub is arranged such that the second end Ub2 is positioned in a direction from the point Q00 toward the point Q13 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Twenty-Sixth Evaluation Example

In a conductive thin wire according to a twenty-sixth evaluation example, the thin wire pieces Ua and the thin wire pieces Ub are connected alternately. If the first end Ub1 of the thin wire piece Ub is positioned at the point Q00, the thin wire piece Ub is arranged such that the second end Ub2 is positioned in a direction from the point Q00 toward the point Q12 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Twenty-Seventh Evaluation Example

In a conductive thin wire according to a twenty-seventh evaluation example, the thin wire pieces Ua and the thin wire pieces Ub are connected alternately. If the first end Ub1 of the thin wire piece Ub is positioned at the point Q00, the thin wire piece Ub is arranged such that the second end Ub2 is positioned in a direction from the point Q00 toward the point Q35 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Twenty-Eighth Evaluation Example

In a conductive thin wire according to a twenty-eighth evaluation example, the thin wire pieces Ua and the thin wire pieces Ub are connected alternately. If the first end Ub1 of the thin wire piece Ub is positioned at the point Q00, the thin wire piece Ub is arranged such that the second end Ub2 is positioned in a direction from the point Q00 toward the point Q23 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Twenty-Ninth Evaluation Example

In a conductive thin wire according to a twenty-ninth evaluation example, the thin wire pieces Ua and the thin wire pieces Ub are connected alternately. If the first end Ub1 of the thin wire piece Ub is positioned at the point Q00, the thin wire piece Ub is arranged such that the second end Ub2 is positioned in a direction from the point Q00 toward the point Q34 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Thirtieth Evaluation Example

In a conductive thin wire according to a thirtieth evaluation example, the thin wire pieces Ua and the thin wire pieces Ub are connected alternately. If the first end Ub1 of the thin wire piece Ub is positioned at the point Q00, the thin wire piece Ub is arranged such that the second end Ub2 is positioned in a direction from the point Q00 toward the point Q45 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Thirty-First Evaluation Example

In a conductive thin wire according to a thirty-first evaluation example, the thin wire pieces Ua and the thin wire pieces Ub are connected alternately. If the first end Ub1 of the thin wire piece Ub is positioned at the point Q00, the thin wire piece Ub is arranged such that the second end Ub2 is positioned in a direction from the point Q00 toward the point Q56 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Thirty-Second Evaluation Example

In a conductive thin wire according to a thirty-second evaluation example, the thin wire pieces Ua and the thin wire pieces Ub are connected alternately. If the first end Ub1 of the thin wire piece Ub is positioned at the point Q00, the thin wire piece Ub is arranged such that the second end Ub2 is positioned in a direction from the point Q00 toward the point Q11 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Thirty-Third Evaluation Example

In a conductive thin wire according to a thirty-third evaluation example, the thin wire pieces Ua and the thin wire pieces Ub are connected alternately. If the first end Ub1 of the thin wire piece Ub is positioned at the point Q00, the thin wire piece Ub is arranged such that the second end Ub2 is positioned in a direction from the point Q00 toward the point Q65 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Thirty-Fourth Evaluation Example

In a conductive thin wire according to a thirty-fourth evaluation example, the thin wire pieces Ua and the thin wire pieces Ub are connected alternately. If the first end Ub1 of the thin wire piece Ub is positioned at the point Q00, the thin wire piece Ub is arranged such that the second end Ub2 is positioned in a direction from the point Q00 toward the point Q54 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Thirty-Fifth Evaluation Example

In a conductive thin wire according to a thirty-fifth evaluation example, the thin wire pieces Ua and the thin wire pieces Ub are connected alternately. If the first end Ub1 of the thin wire piece Ub is positioned at the point Q00, the thin wire piece Ub is arranged such that the second end Ub2 is positioned in a direction from the point Q00 toward the point Q43 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Thirty-Sixth Evaluation Example

In a conductive thin wire according to a thirty-sixth evaluation example, the thin wire pieces Ua and the thin wire pieces Ub are connected alternately. If the first end Ub1 of the thin wire piece Ub is positioned at the point Q00, the thin wire piece Ub is arranged such that the second end Ub2 is positioned in a direction from the point Q00 toward the point Q32 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Thirty-Seventh Evaluation Example

In a conductive thin wire according to a thirty-seventh evaluation example, the thin wire pieces Ua and the thin wire pieces Ub are connected alternately. If the first end Ub1 of the thin wire piece Ub is positioned at the point Q00, the thin wire piece Ub is arranged such that the second end Ub2 is positioned in a direction from the point Q00 toward the point Q53 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Thirty-Eighth Evaluation Example

In a conductive thin wire according to a thirty-eighth evaluation example, the thin wire pieces Ua and the thin wire pieces Ub are connected alternately. If the first end Ub1 of the thin wire piece Ub is positioned at the point Q00, the thin wire piece Ub is arranged such that the second end Ub2 is positioned in a direction from the point Q00 toward the point Q21 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Thirty-Ninth Evaluation Example

In a conductive thin wire according to a thirty-ninth evaluation example, the thin wire pieces Ua and the thin wire pieces Ub are connected alternately. If the first end Ub1 of the thin wire piece Ub is positioned at the point Q00, the thin wire piece Ub is arranged such that the second end Ub2 is positioned in a direction from the point Q00 toward the point Q31 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Fortieth Evaluation Example

In a conductive thin wire according to a fortieth evaluation example, the thin wire pieces Ua and the thin wire pieces Ub are connected alternately. If the first end Ub1 of the thin wire piece Ub is positioned at the point Q00, the thin wire piece Ub is arranged such that the second end Ub2 is positioned in a direction from the point Q00 toward the point Q41 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Forty-First Evaluation Example

In a conductive thin wire according to a forty-first evaluation example, the thin wire pieces Ua and the thin wire pieces Ub are connected alternately. If the first end Ub1 of the thin wire piece Ub is positioned at the point Q00, the thin wire piece Ub is arranged such that the second end Ub2 is positioned in a direction from the point Q00 toward the point Q51 serving as a target position. The thin wire piece Ua extends in a direction different from the direction in which the thin wire piece Ub extends. The magnitude of the angle of the direction in which the thin wire piece Ua extends with respect to the pixel array direction Dy is the same as that of the angle of the direction in which the thin wire piece Ub extends with respect to the pixel array direction Dy.

Forty-Second Evaluation Example

In a conductive thin wire according to a forty-second evaluation example, a plurality of thin wire pieces parallel to the pixel orthogonal direction Dx are connected in the pixel orthogonal direction Dx.

Evaluation

In the moire evaluation, the visibility for human eyes of the moire pattern formed by a display image of the display device 1 with a touch detection function corresponding to each of the twenty-second evaluation example to the forty-second evaluation example is evaluated on a scale of four grades. The scale of four grades for the moire evaluation is as follows. The letter A indicates the case where no moire is visually recognized if the distance between the surface of the display device 1 with a touch detecting function and the human eyes is smaller than 30 cm. The letter B indicates the case where no moire is visually recognized if the distance between the display device 1 with a touch detecting function and the human eyes is equal to or larger than 30 cm. The letter C indicates the case where no moire is visually recognized if the distance between the display device 1 with a touch detecting function and the human eyes is equal to or larger than 60 cm. The letter D indicates the case where moire is visually recognized if the distance between the display device 1 with a touch detecting function and the human eyes is equal to or larger than 60 cm.

The twenty-seventh to the thirty-first evaluation examples and the thirty-third to the thirty-seventh evaluation examples satisfy a second condition. The second condition is that the direction in which the thin wire piece Ub extends forms an angle larger than 34 degrees and smaller than 53 degrees or an angle larger than 54 degrees and smaller than 69 degrees with respect to the pixel array direction Dy. As illustrated in FIG. 19, the twenty-seventh to the thirty-first evaluation examples and the thirty-third to the thirty-seventh evaluation examples are assigned with A, B, and C in the moire evaluation. Thus, the conductive thin wire according to the fourth modification of the first embodiment satisfying the second condition suppresses visual recognition of moire.

1-1K. Advantages

In the display device 1 with a touch detecting function according to the fourth modification of the first embodiment, the conductive thin wires ML1, ML2, ML3, and ML4 include the thin wire piece Ub satisfying the second condition. This can make the period of the light and dark pattern short enough not to be visually recognized by a human. The thin wire piece Ub according to the fourth modification of the first embodiment, for example, extends at an angle with respect to the pixel orthogonal direction Dx and the pixel array direction Dy. If the thin wire piece Ub satisfies the second condition, the angle is made larger than a certain angle. This is likely to shorten the period of the light and dark pattern. In the display device 1 with a touch detecting function according to the fourth modification of the first embodiment, the conductive thin wires ML1, ML2, ML3, and ML4 include the thin wire piece Ub satisfying the second condition. This can reduce the possibility that moire is visually recognized. If the thin wire piece Ua, the thin wire piece Ub, and the thin wire piece Uc satisfy the second condition, the display device 1 with a touch detecting function according to the fourth modification of the first embodiment can reduce the possibility that moire is visually recognized.

In the display device 1 with a touch detecting function according to the fourth modification of the first embodiment, the thin wire piece Ub extends in a direction inclined at an angle with respect to the pixel array direction Dy. The tangent value of the angle is larger than a value obtained by dividing the value of the first unit length Lx2 by a value twice as large as the second unit length Ly2 and smaller than a value obtained by dividing a value twice as large as the first unit length Lx2 by the value of the second unit length Ly2. In addition, the tangent value of the angle is different from a value obtained by dividing the value of the first unit length Lx2 by the value of the second unit length Ly2. Thus, the angle of the direction in which the thin wire piece Ub extends with respect to the pixel orthogonal direction Dx and the pixel array direction Dy is made larger than a certain angle. This is likely to shorten the period of the light and dark pattern. As a result, the display device 1 with a touch detecting function according to the fourth modification of the first embodiment can reduce the possibility that moire is visually recognized.

1-2. Second Embodiment

Figure 20:
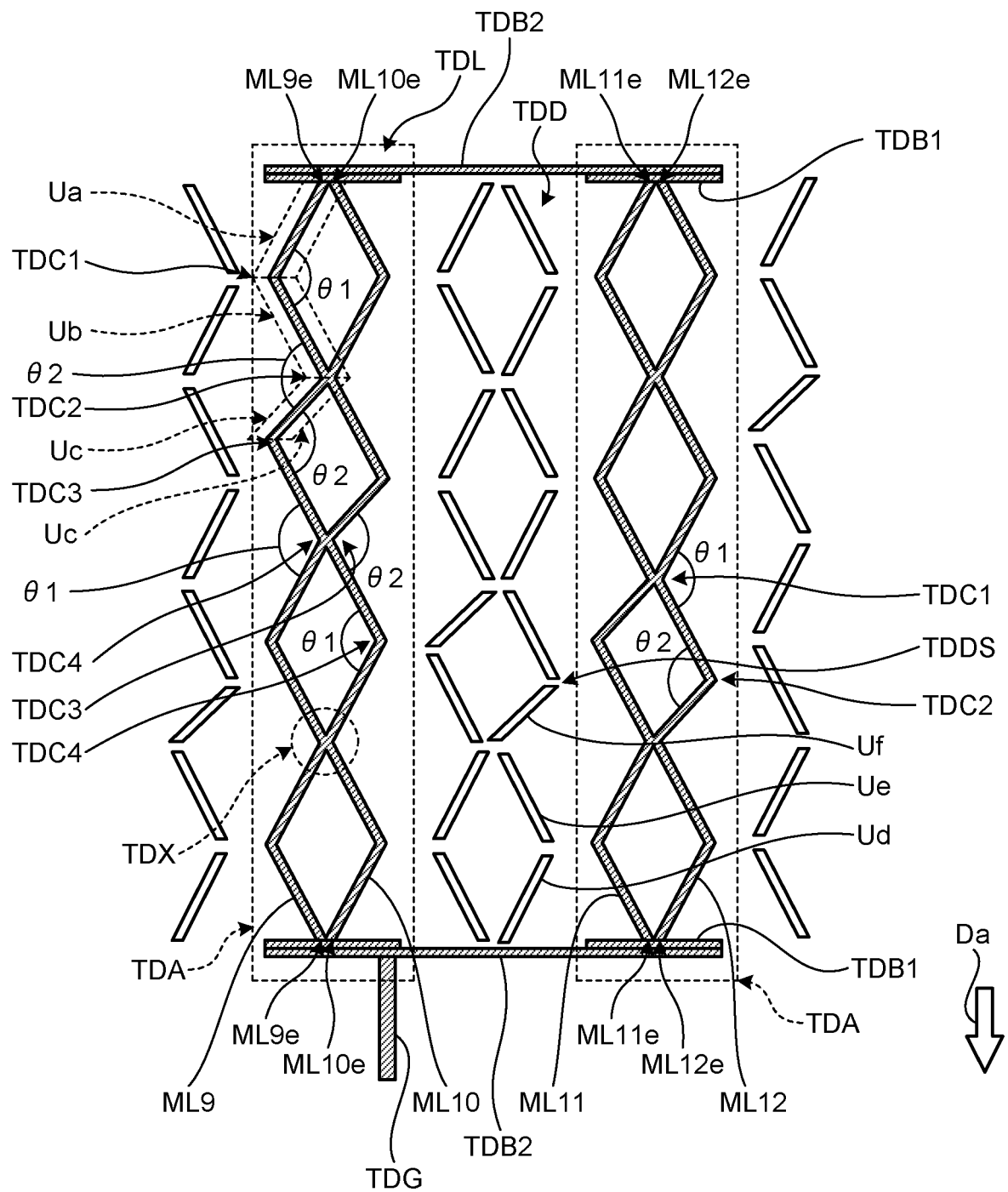
FIG. 20 is a schematic of arrangement of a touch detection electrode according to a second embodiment.

The following describes a display device 1 with a touch detecting function according to a second embodiment. FIG. 20 is a schematic of arrangement of a touch detection electrode TDL according to the second embodiment. Components similar to those of the first embodiment are denoted by the same reference numerals, and a duplicate explanation thereof will be omitted.

As illustrated in FIG. 20, the touch detection electrode TDL according to the second embodiment includes a plurality of conductive thin wires ML9, ML10, ML11, and ML12 extending in the direction Da on a plane parallel to a counter substrate 3 in an overhead view. The conductive thin wires ML9, ML10, ML11, and ML12 are zigzag lines or wavy lines bent at bent portions TDC1, TDC2, TDC3, and TDC4. The conductive thin wires ML9, ML10, ML11, and ML12 are made of the same material. The conductive thin wire ML9 and the conductive thin wire ML10 are connected to each other at an end ML9e of the conductive thin wire ML9 and an end ML10e of the conductive thin wire ML10 via a first conductive part TDB1, thereby establishing electrical continuity therebetween. The conductive thin wire ML9 and the conductive thin wire ML10 are arranged such that bent portions thereof are into contact with each other and belong to a detection area TDA. The conductive thin wire ML9 and the conductive thin wire ML10 are connected to each other at an intersection TDX serving as the contact portion, thereby establishing electrical continuity therebetween. The conductive thin wire ML11 and the conductive thin wire ML12 are connected to each other at an end ML11e of the conductive thin wire ML11 and an end ML12e of the conductive thin wire ML12 via the first conductive part TDB1, thereby establishing electrical continuity therebetween. The conductive thin wire ML11 and the conductive thin wire ML12 are arranged such that bent portions thereof are into contact with each other and belong to the detection area TDA. The conductive thin wire ML11 and the conductive thin wire ML12 are connected to each other at the intersection TDX serving as the contact portion, thereby establishing electrical continuity therebetween.

The conductive thin wire ML9 corresponds to the conductive thin wire ML1 according to the first embodiment. The conductive thin wire ML10 includes the thin wire piece Ua, the thin wire piece Ub, and the thin wire piece Uc. The conductive thin wire ML10 is formed of the thin wire piece Ub, the thin wire piece Ua, the thin wire piece Ub, the thin wire piece Uc, the thin wire piece Ub, the thin wire piece Ua, the thin wire piece Ub, and the thin wire piece Ua connected in this order from the end ML10e in the direction Da. The position in the direction Da of every other bent portion of the conductive thin wire ML10 is the same as that of every other bent portion of the conductive thin wire ML9. In the conductive thin wire ML10, an angle θ2 is different from an angle θ1. The angle θ2 is formed by the thin wire piece Ub and the thin wire piece Uc adjacent to each other at the bent portion TDC3, whereas the angle θ1 is formed by the thin wire piece Ua and the thin wire piece Ub adjacent to each other at the bent portion TDC4 next to the bent portion TDC3.

The conductive thin wire ML11 corresponds to the conductive thin wire ML2 according to the first embodiment. The conductive thin wire ML12 includes the thin wire piece Ua, the thin wire piece Ub, and the thin wire piece Uc. The conductive thin wire ML12 is formed of the thin wire piece Ub, the thin wire piece Ua, the thin wire piece Ub, the thin wire piece Ua, the thin wire piece Ub, the thin wire piece Uc, the thin wire piece Ub, and the thin wire piece Ua connected in this order from the end ML12e in the direction Da. The position in the direction Da of every other bent portion of the conductive thin wire ML12 is the same as that of every other bent portion of the conductive thin wire ML11. In the conductive thin wire ML12, the angle θ1 is different from the angle θ2. The angle θ1 is formed by the thin wire piece Ua and the thin wire piece Ub adjacent to each other at the bent portion TDC1, whereas the angle θ2 is formed by the thin wire piece Ub and the thin wire piece Uc adjacent to each other at the bent portion TDC2 next to the bent portion TDC1.

The conductive thin wire ML9 and the conductive thin wire ML10 are not necessarily connected to each other at the bent portions. The conductive thin wire ML11 and the conductive thin wire ML12 are not necessarily connected to each other at the bent portions. The conductive thin wire ML9 and the conductive thin wire ML10 may be connected to each other at an intermediate portion of the thin wire piece Ua of the conductive thin wire ML9 and an intermediate portion of the thin wire piece Ub of the conductive thin wire ML10, thereby establishing electrical continuity therebetween, for example.

1-2A. Advantages

In the touch detection electrode TDL according to the second embodiment, the shape of the conductive thin wire ML9 is different from that of the conductive thin wire ML10 adjacent thereto, and the shape of the conductive thin wire ML11 is different from that of the conductive thin wire ML12 adjacent thereto. Thus, the angle formed by the conductive thin wires ML9, ML10, ML11, and ML12 and the pattern appearing on the display area Ad varies depending on the position. As a result, the display device 1 with a touch detecting function according to the second embodiment keeps the light and dark pattern described above from having a constant period. This can reduce the possibility that moire is visually recognized.

In the display device 1 with a touch detecting function according to the second embodiment, the shape formed by combining the conductive thin wire ML9 and the conductive thin wire ML10 through the first conductive part TDB1 is different from the shape formed by combining the conductive thin wire ML11 and the conductive thin wire ML12 through the first conductive part TDB1. Thus, the angle formed by the conductive thin wires ML9, ML10, ML11, and ML12 and the pattern appearing on the display area Ad varies depending on the position. As a result, the display device 1 with a touch detecting function according to the second embodiment keeps the light and dark pattern described above from having a constant period. This can reduce the possibility that moire is visually recognized.

In the display device 1 with a touch detecting function according to the second embodiment, the angle θ1 formed by the thin wire piece Ua and the thin wire piece Ub adjacent to each other at the bent portion TDC1 or the bent portion TDC4 is different from the angle θ2 formed by the thin wire piece Ub and the thin wire piece Uc adjacent to each other at the bent portion TDC2 or the bent portion TDC3 next to the bent portions TDC1 and TDC4 in the conductive thin wires ML9, ML10, ML11, and ML12. Thus, the angle formed by the conductive thin wires ML9, ML10, ML11, and ML12 and the pattern appearing on the display area Ad varies depending on the position. As a result, the display device 1 with a touch detecting function according to the first embodiment keeps the light and dark pattern described above from having a constant period. This can reduce the possibility that moire is visually recognized.

If a part of a first conductive thin wire included in the detection area TDA is formed thin, thereby making electrical continuity unreliable, the display device 1 with a touch detecting function according to the second embodiment can increase the probability of touch detection because of the intersection TDX coupling the first conductive thin wire to a second conductive thin wire. If a part of the conductive thin wire ML9 is formed thin, thereby making electrical continuity unreliable, for example, the display device 1 with a touch detecting function according to the second embodiment can increase the probability of touch detection because of the intersection TDX coupling the conductive thin wire ML9 to the conductive thin wire ML10.

1-2B. First Modification of the Second Embodiment

Figure 21:
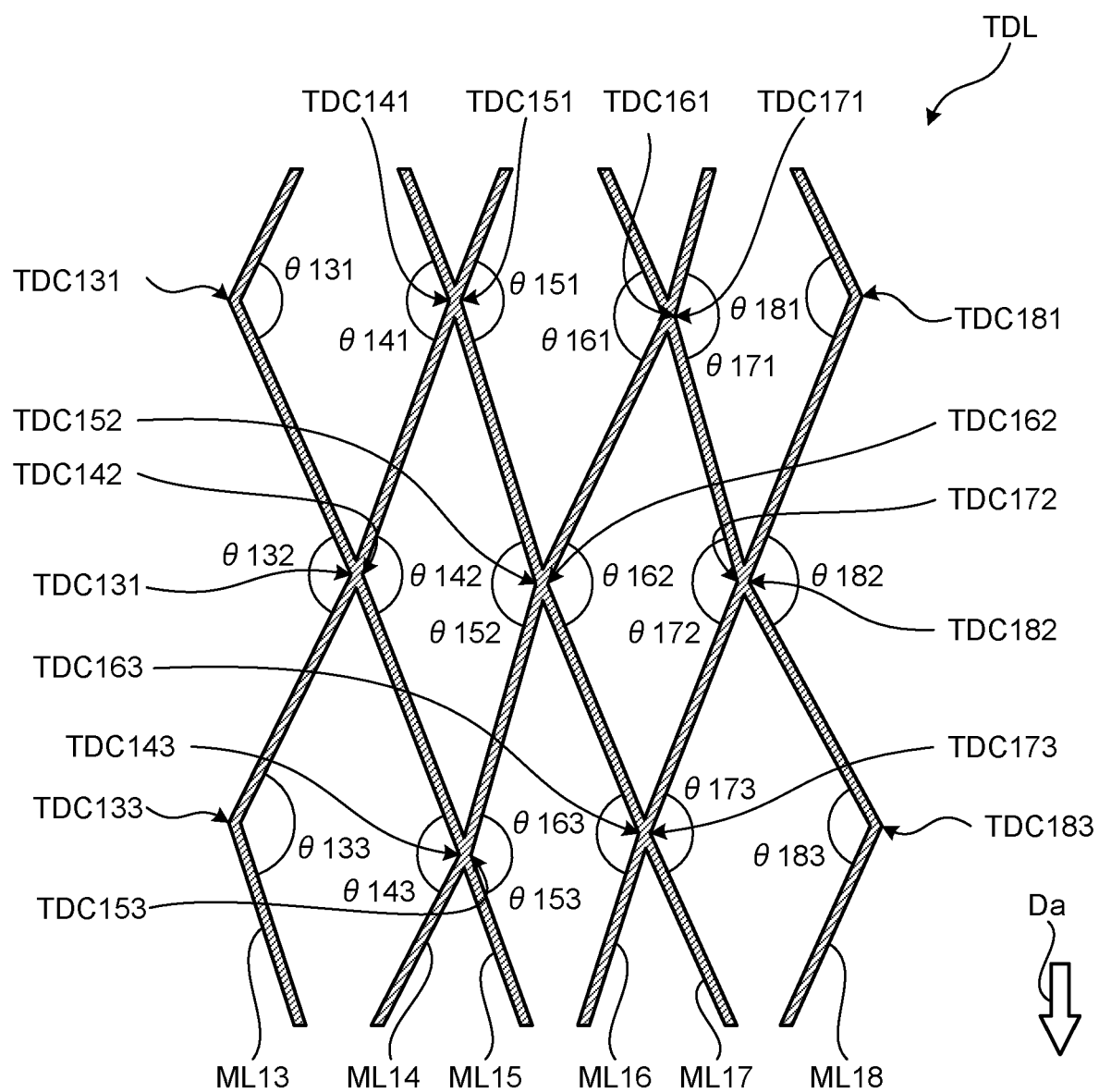
FIG. 21 is a schematic of partial arrangement of a touch detection electrode according to a first modification of the second embodiment.

FIG. 21 is a schematic of a part of arrangement of a touch detection electrode TDL according to a first modification of the second embodiment. The touch detection electrode TDL according to the first modification of the second embodiment includes a plurality of conductive thin wires ML13 to ML18. The conductive thin wires ML13 to ML18 extend in a manner having portions at which bent portions are into contact with each other on a plane parallel to the counter substrate 3. The conductive thin wires ML13 to ML18 are zigzag lines or wavy lines bent at the bent portions. The conductive thin wires ML13 to ML18 are made of the same material. The conductive thin wires ML13 to ML18 have shapes different from one another. The conductive thin wires ML13 to ML18 are each formed of a plurality of thin wire pieces extending in different directions. While the first modification of the second embodiment illustrates no dummy electrode TDD for explanation, the dummy electrode TDD may be provided. Components similar to those of the first embodiment or the second embodiment are denoted by the same reference numerals, and a duplicate explanation thereof will be omitted.

The following describes a part of the conductive thin wire ML13. The angle formed by the thin wire pieces adjacent to each other at a bent portion TDC131 is an angle θ131. The angle formed by the thin wire pieces adjacent to each other at a bent portion TDC132 next to the bent portion TDC131 is an angle θ132. The angle formed by the thin wire pieces adjacent to each other at a bent portion TDC133 next to the bent portion TDC132 is an angle θ133. Because the conductive thin wire ML13 is formed only of the thin wire pieces extending in different directions, the angle θ131, the angle θ132, and the angle θ133 are different from one another.

The following describes a part of the conductive thin wire ML14. The angle formed by the thin wire pieces adjacent to each other at a bent portion TDC141 is an angle θ141. The angle formed by the thin wire pieces adjacent to each other at a bent portion TDC142 next to the bent portion TDC141 is an angle θ142. The angle formed by the thin wire pieces adjacent to each other at a bent portion TDC143 next to the bent portion TDC142 is an angle θ143. Because the conductive thin wire ML14 is formed only of the thin wire pieces extending in different directions, the angle θ141, the angle θ142, and the angle θ143 are different from one another.

The following describes a part of the conductive thin wire ML15. The angle formed by the thin wire pieces adjacent to each other at a bent portion TDC151 is an angle θ151. The angle formed by the thin wire pieces adjacent to each other at a bent portion TDC152 next to the bent portion TDC151 is an angle θ152. The angle formed by the thin wire pieces adjacent to each other at a bent portion TDC153 next to the bent portion TDC152 is an angle θ153. Because the conductive thin wire ML15 is formed only of the thin wire pieces extending in different directions, the angle θ151, the angle θ152, and the angle θ153 are different from one another.

The following describes a part of the conductive thin wire ML16. The angle formed by the thin wire pieces adjacent to each other at a bent portion TDC161 is an angle θ161. The angle formed by the thin wire pieces adjacent to each other at a bent portion TDC162 next to the bent portion TDC161 is an angle θ162. The angle formed by the thin wire pieces adjacent to each other at a bent portion TDC163 next to the bent portion TDC162 is an angle θ163. Because the conductive thin wire ML16 is formed only of the thin wire pieces extending in different directions, the angle θ161, the angle θ162, and the angle θ163 are different from one another.

The following describes a part of the conductive thin wire ML17. The angle formed by the thin wire pieces adjacent to each other at a bent portion TDC171 is an angle θ171. The angle formed by the thin wire pieces adjacent to each other at a bent portion TDC172 next to the bent portion TDC171 is an angle θ172. The angle formed by the thin wire pieces adjacent to each other at a bent portion TDC173 next to the bent portion TDC172 is an angle θ173. Because the conductive thin wire ML17 is formed only of the thin wire pieces extending in different directions, the angle θ171, the angle θ172, and the angle θ173 are different from one another.

The following describes a part of the conductive thin wire ML18. The angle formed by the thin wire pieces adjacent to each other at a bent portion TDC181 is an angle θ181. The angle formed by the thin wire pieces adjacent to each other at a bent portion TDC182 next to the bent portion TDC181 is an angle θ182. The angle formed by the thin wire pieces adjacent to each other at a bent portion TDC183 next to the bent portion TDC182 is an angle θ183. Because the conductive thin wire ML18 is formed only of the thin wire pieces extending in different directions, the angle θ181, the angle θ182, and the angle θ183 are different from one another.

The difference between the angle θ131 and the angle θ132 and the difference between the angle θ132 and the angle θ133 are preferably 0 degree to 15 degrees inclusive. The difference between the angle θ141 and the angle θ142 and the difference between the angle θ142 and the angle θ143 are preferably 0 degree to 15 degrees inclusive. The difference between the angle θ151 and the angle θ152 and the difference between the angle θ152 and the angle θ153 are preferably 0 degree to 15 degrees inclusive. The difference between the angle θ161 and the angle θ162 and the difference between the angle θ162 and the angle θ163 are preferably 0 degree to 15 degrees inclusive. The difference between the angle θ171 and the angle θ172 and the difference between the angle θ172 and the angle θ173 are preferably 0 degree to 15 degrees inclusive. The difference between the angle θ181 and the angle θ182 and the difference between the angle θ182 and the angle θ183 are preferably 0 degree to 15 degrees inclusive.

1-2C. Advantages

In the touch detection electrode TDL according to the first modification of the second embodiment, the conductive thin wires ML13 to ML18 have shapes different from one another. Thus, the angle formed by the conductive thin wires ML13 to ML18 and the pattern appearing on the display area Ad varies depending on the position. As a result, the touch detection electrode TDL according to the first modification of the second embodiment keeps the light and dark pattern described above from having a constant period. This can reduce the possibility that moire is visually recognized.

In the touch detection electrode TDL according to the first modification of the second embodiment, the angles formed by the thin wire pieces adjacent to each other at the bent portions are different from one another in the conductive thin wires ML13 to ML18. Thus, the angle formed by the conductive thin wires ML13 to ML18 and the pattern appearing on the display area Ad varies depending on the position. As a result, the touch detection electrode TDL according to the first modification of the second embodiment keeps the light and dark pattern described above from having a constant period. This can reduce the possibility that moire is visually recognized.

Thus, the angle formed by the conductive thin wires ML13 to ML18 of the touch detection electrode TDL and the pattern appearing on the display area Ad varies depending on the position in the touch detection electrode TDL according to the first modification of the second embodiment. This can keep the light and dark pattern described above from having a constant period, thereby reducing the possibility that moire is visually recognized.

By setting the difference between the angle θ131 and the angle θ132 and the difference between the angle θ132 and the angle θ133 to 0 degree to 15 degrees inclusive, for example, it is possible to facilitate the maintenance of the uniformity of the luminance in the display area Ad. As a result, the touch detection electrode TDL according to the first modification of the second embodiment can reduce the possibility that what is called roughness on the display area Ad is visually recognized.

If a part of a first conductive thin wire among the conductive thin wires ML13 to ML18 is formed thin, thereby making electrical continuity unreliable, the display device 1 with a touch detecting function according to the first modification of the second embodiment can increase the probability of touch detection because of the intersection TDX coupling the first conductive thin wire to a second conductive thin wire. If a part of a first conductive thin wire included in the detection area TDA is formed thin, thereby making electrical continuity unreliable, for example, the display device 1 with a touch detecting function according to the first modification of the second embodiment can increase the probability of touch detection because of the intersection TDX coupling the first conductive thin wire to a second conductive thin wire. If a part of the conductive thin wire ML13 is formed thin, thereby making electrical continuity unreliable, for example, the display device 1 with a touch detecting function according to the first modification of the second embodiment can increase the probability of touch detection because of the intersection TDX coupling the conductive thin wire ML13 to the conductive thin wire ML14.

1-3. Third Embodiment

Figure 22:
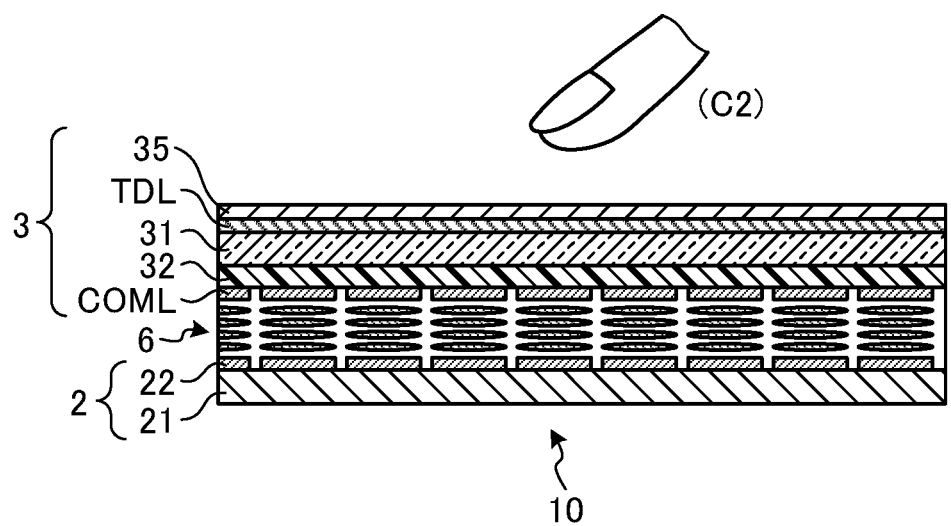
FIG. 22 is a sectional view of a schematic sectional structure of the display unit with a touch detecting function according to a third embodiment.

FIG. 22 is a sectional view of a schematic sectional structure of the display unit with a touch detecting function according to a third embodiment. In the display device 1 with a touch detecting function according to the embodiments and the modifications, the display unit 10 with a touch detecting function is formed by integrating the liquid-crystal display unit 20 provided with liquid crystals of various types of modes, such as the FFS mode and the IPS mode, and the touch detecting device 30. Instead of this, a display unit 10 with a touch detecting function according to the third embodiment illustrated in FIG. 22 may be formed by integrating liquid crystals of various types of modes, such as a twisted nematic (TN) mode, a vertical alignment (VA) mode, and an electrically controlled birefringence (ECB) mode, and a touch detecting device.

2. APPLICATION EXAMPLES

The following describes application examples of the displaying device 1 with a touch detecting function explained in the first to the third embodiments and the modifications with reference to FIG. 23 to FIG. 35. FIG. 23 to FIG. 35 are schematics of examples of an electronic apparatus to which the display device with a touch detecting function or the display device according to any of the first to the third embodiments and the modifications is applied. The display device 1 with a touch detecting function and the display device according to the first to the third embodiments and the modifications are applicable to electronic apparatuses of all fields, such as television apparatuses, digital cameras, notebook personal computers, portable electronic apparatuses including mobile phones, and video cameras. In other words, the display device 1 with a touch detecting function and the display device according to the first to the third embodiments and the modifications are applicable to electronic apparatuses of all fields that display video signals received from the outside or video signals generated inside thereof as an image or video.

2-1. First Application Example

Figure 23:
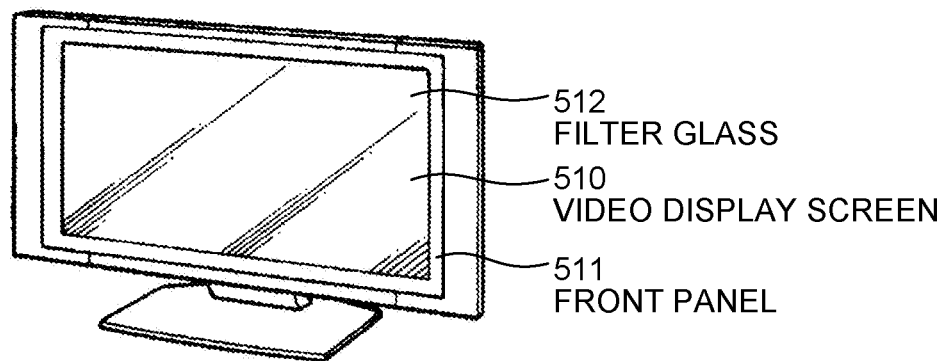
FIG. 23 is a schematic of an example of an electronic apparatus to which the display device with a touch detecting function or the display device according to any of the first to the third embodiments and the modifications is applied.

An electronic apparatus illustrated in FIG. 23 is a television apparatus to which the display device 1 with a touch detecting function and the display device according to the first to the third embodiments and the modifications are applied. The television apparatus has a video display screen 510 including a front panel 511 and a filter glass 512, for example. The video display screen 510 corresponds to the display device 1 with a touch detecting function and the display device according to the first to the third embodiments and the modifications.

2-2. Second Application Example

Figure 24:
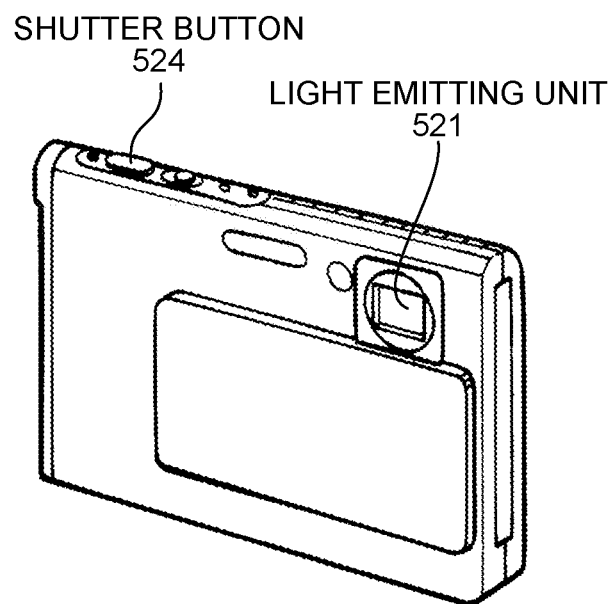
FIG. 24 is a schematic of an example of an electronic apparatus to which the display device with a touch detecting function or the display device according to any of the first to the third embodiments and the modifications is applied.
Figure 25:
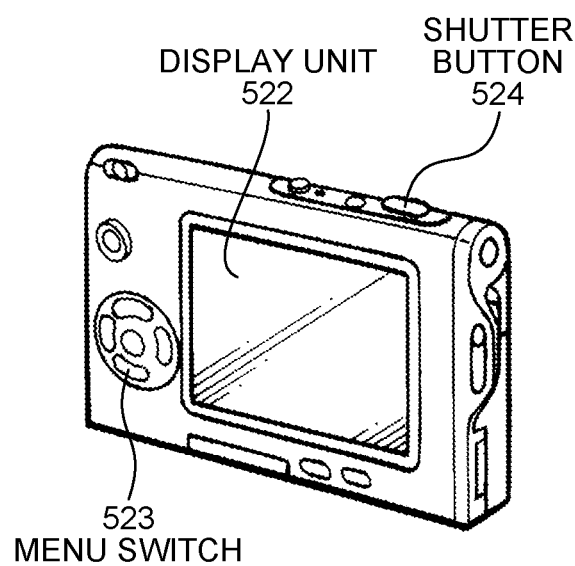
FIG. 25 is a schematic of the example of an electronic apparatus to which the display device with a touch detecting function or the display device according to any of the first to the third embodiments and the modifications is applied.

An electronic apparatus illustrated in FIG. 24 and FIG. 25 is a digital camera to which the display device 1 with a touch detecting function and the display device according to the first to the third embodiments and the modifications are applied. The digital camera includes a light emitting unit 521 for flash, a display unit 522, a menu switch 523, and a shutter button 524, for example. The display unit 522 corresponds to the display device 1 with a touch detecting function and the display device according to the first to the third embodiments and the modifications.

2-3. Third Application Example

Figure 26:
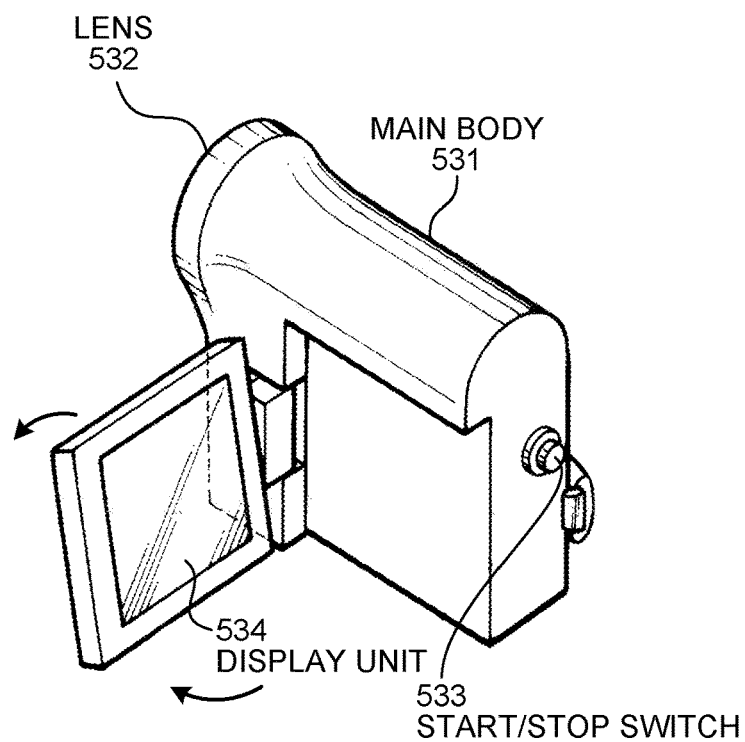
FIG. 26 is a schematic of an example of an electronic apparatus to which the display device with a touch detecting function or the display device according to any of the first to the third embodiments and the modifications is applied.

An electronic apparatus illustrated in FIG. 26 is a video camera to which the display device 1 with a touch detecting function and the display device according to the first to the third embodiments and the modifications are applied. The video camera includes a main body 531, a lens 532 provided to the front side surface of the main body 531 and used for photographing a subject, a start/stop switch 533 used in photographing, and a display unit 534, for example. The display unit 534 corresponds to the display device 1 with a touch detecting function and the display device according to the first to the third embodiments and the modifications.

2-4. Fourth Application Example

Figure 27:
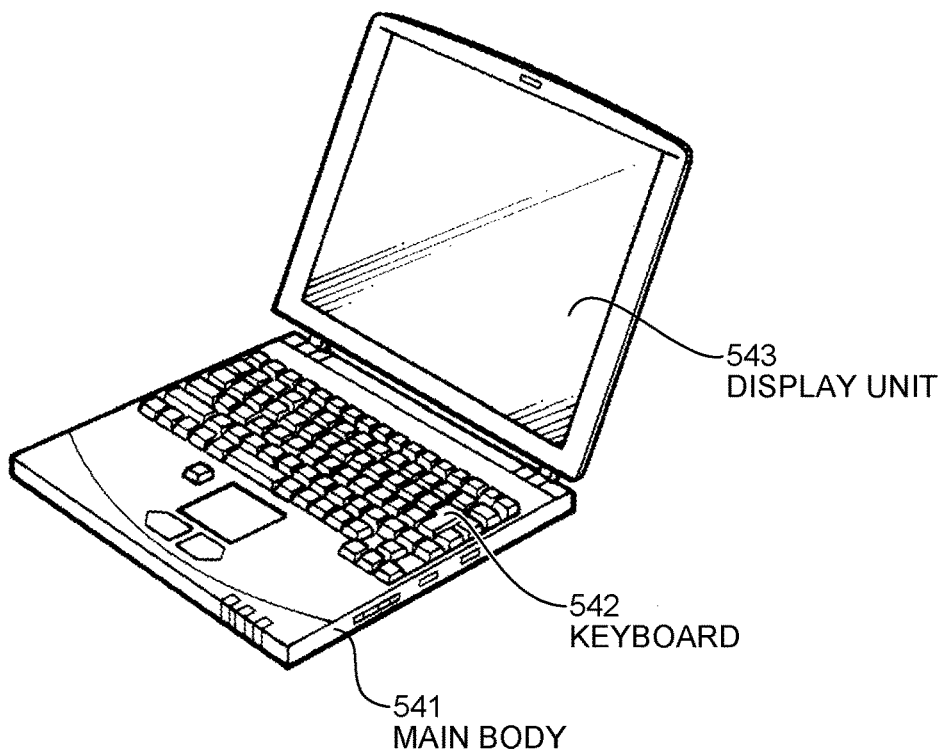
FIG. 27 is a schematic of an example of an electronic apparatus to which the display device with a touch detecting function or the display device according to any of the first to the third embodiments and the modifications is applied.
Figure 28:
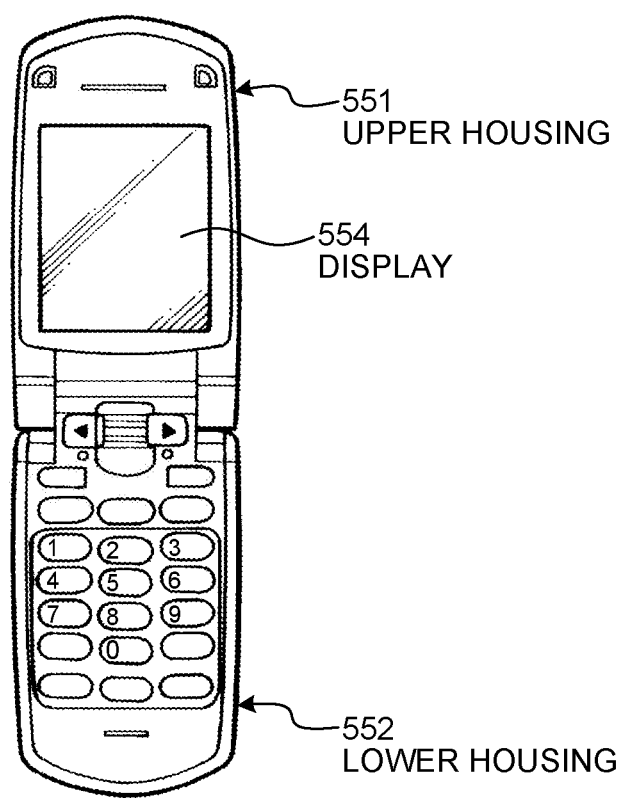
FIG. 28 is a schematic of an example of an electronic apparatus to which the display device with a touch detecting function or the display device according to any of the first to the third embodiments and the modifications is applied.
Figure 29:
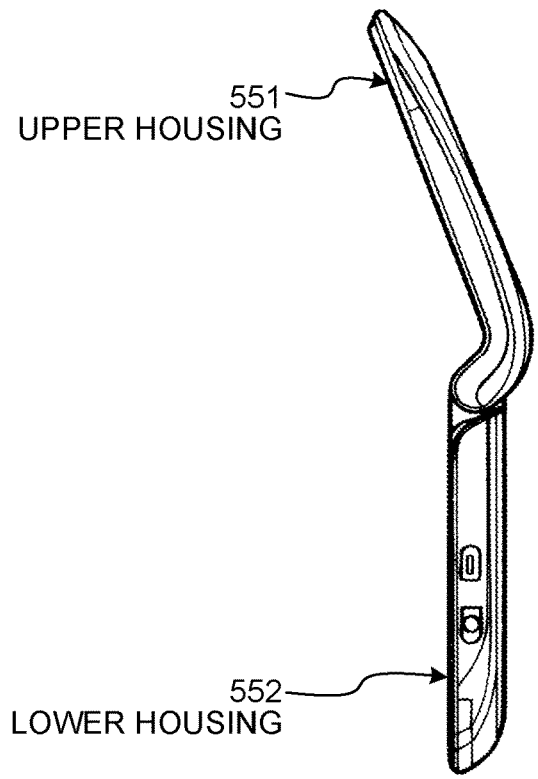
FIG. 29 is a schematic of an example of an electronic apparatus to which the display device with a touch detecting function or the display device according to any of the first to the third embodiments and the modifications is applied.
Figure 30:
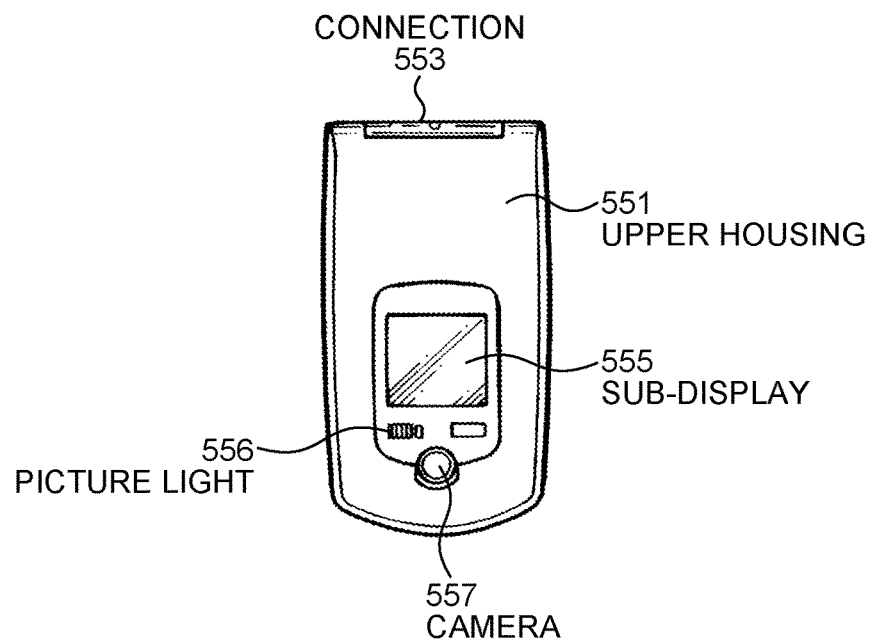
FIG. 30 is a schematic of an example of an electronic apparatus to which the display device with a touch detecting function or the display device according to any of the first to the third embodiments and the modifications is applied.
Figure 31:
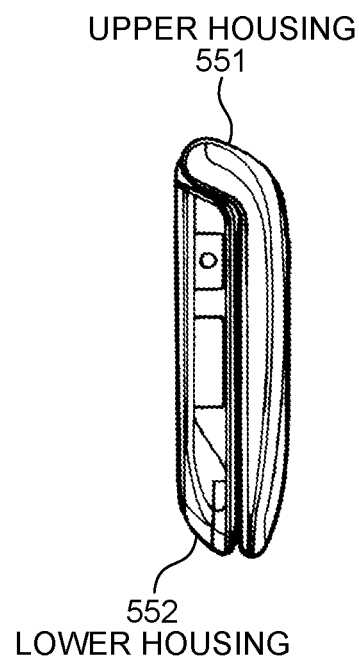
FIG. 31 is a schematic of an example of an electronic apparatus to which the display device with a touch detecting function or the display device according to any of the first to the third embodiments and the modifications is applied.
Figure 32:
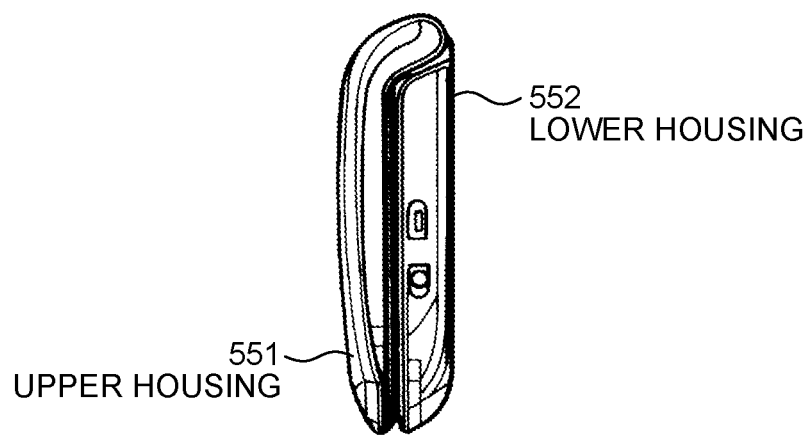
FIG. 32 is a schematic of an example of an electronic apparatus to which the display device with a touch detecting function or the display device according to any of the first to the third embodiments and the modifications is applied.
Figure 33:
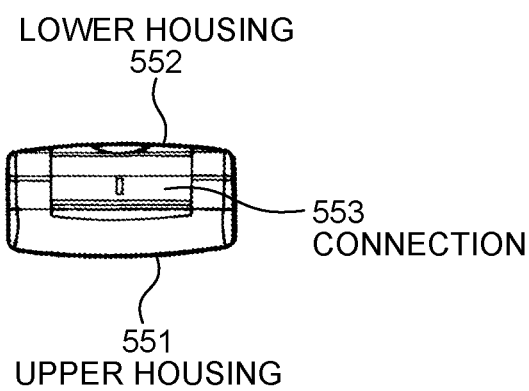
FIG. 33 is a schematic of an example of an electronic apparatus to which the display device with a touch detecting function or the display device according to any of the first to the third embodiments and the modifications is applied.
Figure 34:
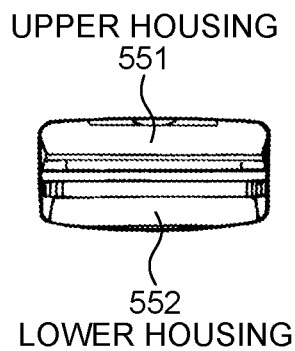
FIG. 34 is a schematic of an example of an electronic apparatus to which the display device with a touch detecting function or the display device according to any of the first to the third embodiments and the modifications is applied.

An electronic apparatus illustrated in FIG. 27 is a notebook personal computer to which the display device 1 with a touch detecting function and the display device according to the first to the third embodiments and the modifications are applied. The notebook personal computer includes a main body 541, a keyboard 542 used for input of characters, and a display unit 543 that displays an image, for example. The display unit 543 corresponds to the display device 1 with a touch detecting function and the display device according to the first to the third embodiments and the modifications.

2-5. Fifth Application Example

An electronic apparatus illustrated in FIG. 28 to FIG. 35 is a mobile phone to which the display device 1 with a touch detecting function and the display device according to the first to the third embodiments and the modifications are applied. The mobile phone includes an upper housing 551 and a lower housing 552 connected by a connection (a hinge) 553, for example. The mobile phone includes a display 554, a sub-display 555, a picture light 556, and a camera 557. The display 554 and/or the sub-display 555 correspond to the display device 1 with a touch detecting function and the display device according to the first to the third embodiments and the modifications.

2-6. Sixth Application Example

Figure 35:
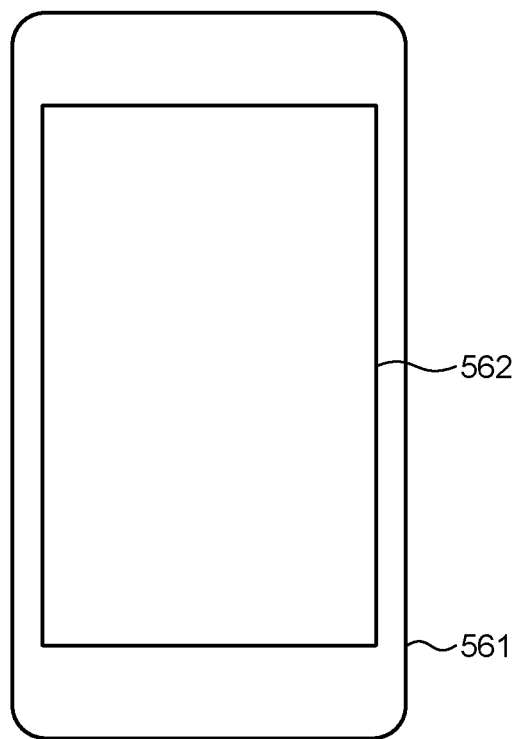
FIG. 35 is a schematic of an example of an electronic apparatus to which the display device with a touch detecting function or the display device according to any of the first to the third embodiments and the modifications is applied.

An electronic apparatus illustrated in FIG. 35 operates as a mobile computer, a multifunctional mobile phone, a mobile computer capable of making a voice call, or a mobile computer capable of performing communications. The electronic apparatus is a portable information terminal, which may be called a smartphone or a tablet terminal. The portable information terminal includes a display unit 562 on the surface of a housing 561, for example. The display unit 562 corresponds to the display device 1 with a touch detecting function and the display device according to the first to the third embodiments and the modifications.

3. ASPECTS OF THE PRESENT DISCLOSURE

The present disclosure includes the following aspects.
(1) A display device with a touch detecting function comprising:
  a substrate;
  a display area in which pixels each composed of a plurality of color areas are arranged in a matrix on a plane parallel to a surface of the substrate;
  a touch detection electrode provided with a plurality of conductive thin wires extending on a plane parallel to the surface of the substrate, each of the conductive thin wires including a plurality of thin wire pieces each having a linear shape and including a first end and a second end, the second end of one of adjacent thin wire pieces and the first end of the other of the adjacent thin wire pieces being connected to each other;
  a drive electrode having capacitance for the touch detection electrode; and
  a display functional layer having a function to display an image on the display area, wherein
  the adjacent thin wire pieces are arranged so as to be bent at a bent portion serving as a portion at which the second end of the one thin wire piece of the adjacent thin wire pieces is connected to the first end of the other thin wire piece of the adjacent thin wire pieces, and
  the conductive thin wires include a bent portion having an angle formed by the adjacent thin wire pieces different from angles of the other bent portions.
(2) The display device with a touch detecting function according to (1), wherein the adjacent thin wires have shapes different from each other.

(3) The display device with a touch detecting function according to (1), wherein the conductive thin wires are configured such that an angle formed by thin wire pieces adjacent to each other at a bent portion different from an angle formed by thin wire pieces adjacent to each other at a bent portion next to the bent portion.

(4) The display device with a touch detecting function according to (1), wherein, when the maximum length of one pixel in a pixel orthogonal direction orthogonal to a pixel array direction on the plane parallel to the surface of the substrate is determined to be a first unit length, and the maximum length of one pixel in a direction parallel to the pixel array direction is determined to be a second unit length, the thin wire pieces extend in a direction inclined at an angle with respect to the pixel array direction, and a tangent value of the angle is larger than a value obtained by dividing the value of the first unit length by a value twice as large as the second unit length, is smaller than a value obtained by dividing a value twice as large as the first unit length by the value of the second unit length, and is different from a value obtained by dividing the value of the first unit length by the value of the second unit length.

(5) The display device with a touch detecting function according to (1), wherein the thin wire pieces extend in a direction inclined at an angle larger than 27 degrees and smaller than 45 degrees or an angle larger than 45 degrees and smaller than 63 degrees with respect to a pixel array direction in which a color area having the highest human visibility among the color areas is aligned.

(6) The display device with a touch detecting function according to claim 1, wherein the conductive thin wires adjacent to each other are arranged in a manner having no part intersecting with each other.

(7) The display device with a touch detecting function according to (1), wherein the conductive thin wires adjacent to each other are arranged in a manner having a contact part at which the bent portions are into contact with each other, and one conductive thin wire of the adjacent conductive thin wires is connected to the other conductive thin wire of the adjacent conductive thin wires at the contact part.

(8) An electronic apparatus having a display device with a touch detecting function, the display device with a touch detecting function comprising:
  a substrate;
  a display area in which pixels each composed of a plurality of color areas are arranged in a matrix on a plane parallel to a surface of the substrate;
  a touch detection electrode provided with a plurality of conductive thin wires extending on a plane parallel to the surface of the substrate, each of the conductive thin wires including a plurality of thin wire pieces each having a linear shape and including a first end and a second end, the second end of one of adjacent thin wire pieces and the first end of the other of the adjacent thin wire pieces being connected to each other;
  a drive electrode having capacitance for the touch detection electrode; and
  a display functional layer having a function to display an image on the display area,
  wherein
    the adjacent thin wire pieces are arranged so as to be bent at a bent portion serving as a portion at which the second end of the one thin wire piece of the adjacent thin wire pieces is connected to the first end of the other thin wire piece of the adjacent thin wire pieces, and
    the conductive thin wires include a bent portion having an angle formed by the adjacent thin wire pieces different from angles of the other bent portions.

The display device with a touch detecting function and the electronic apparatus according to the present disclosure can reduce the possibility that moire is visually recognized while using a touch detection electrode made of a conductive material, such as a metal material.

The electronic apparatus according to the present disclosure includes the above-mentioned display device with a touch detecting function. Examples of the electronic apparatus according to the present disclosure include, but are not limited to, television apparatuses, digital cameras, personal computers, video cameras, and portable electronic apparatuses, such as mobile phones.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
   a display panel,
   a detection electrode arranged on the display panel and including wire pieces, the detection electrode including a first wire and a second wire,
   wherein the first wire includes a first bent portion,
   wherein the second wire includes a second bent portion,
   wherein each of the first bent portion and the second bent portion is formed by two of the wire pieces and includes a first edge and a second edge,
   wherein an angle of the first bent portion is different from an angle of the second bent portion,
   wherein the first edge of the first bent portion and the first edge of the second bent portion are connected by a connecting portion,
   wherein the second edge of the first bent portion and the second edge of the second bent portion are not connected each other,
   wherein the detection electrode further includes a third wire,
   wherein the third wire includes a third bent portion formed by two of the wire pieces, an angle of which is different from at least one of the angle of the first bent portion and the angle of the second bent portion, and
   wherein the first wire and the third wire are connected by the connecting portion.

2. The display device according to claim 1,
   wherein the connecting portion extends in a first direction, and the first bent portion and the second bent portion is apart from each other.

3. The display device according to claim 1,
   wherein the first wire is arranged between the third wire and the second wire, and
   wherein a distance between the first wire and the third wire is different from a distance between the first wire and the second wire.

4. The display device according to claim 3,
   wherein the detection electrode further includes a fourth wire,
   wherein the second wire is arranged between the first wire and the fourth wire, and wherein a distance between the first wire and the second wire is different from a distance between the second wire and the fourth wire.

5. The display device according to claim 1,
wherein the detection electrode further includes a fourth wire,
wherein the fourth wire includes a fourth bent portion formed by two of the wire pieces, an angle of which is different from at least one of the angle of the first bent portion and the angle of the second bent portion, and
wherein the second wire and the fourth wire are connected by the connecting portion.

6. The display device according to claim 1,
wherein the first wire includes a third bent portion formed by two of the wire pieces, an angle of which is different from at least one of the angle of the first bent portion and the angle of the second bent portion.

7. The display device according to claim 1,
wherein a second part of the wire pieces is not connected to the first wire, the second wire, and the connecting portion, and
wherein the second part of the wire pieces is arranged between the first wire and the second wire.

8. The display device according to claim 1,
wherein the display panel includes a plurality of pixels, and
wherein the maximum length of one pixel in a pixel orthogonal direction orthogonal to a pixel array direction on a plane parallel to a surface of the display panel is a first unit length,
wherein the maximum length of one pixel in the pixel array direction is a second unit length,
wherein the wire pieces extend in a direction inclined at an angle with respect to the pixel array direction, and
wherein a tangent value of the angle
is larger than a value obtained by dividing the value of the first unit length by a value twice as large as the second unit length,
is smaller than a value obtained by dividing a value twice as large as the first unit length by the value of the second unit length, and
is different from a value obtained by dividing the value of the first unit length by the value of the second unit length.

9. The display device according to claim 1,
wherein the display panel includes a plurality of pixels, and
wherein the wire pieces extend in a direction inclined at an angle larger than 27 degrees and smaller than 45 degrees or at an angle larger than 45 degrees and smaller than 63 degrees with respect to a pixel array direction in which a color area having the highest human visibility among a plurality of color areas included in each of the pixels is aligned.

10. The display device according to claim 1,
wherein a difference between the angle of the first bent portion and the angle of the second bent portion is less than 15 degrees.

11. A display device comprising:
a display panel, and
a detection electrode arranged on the display panel and including wire pieces, the detection electrode including a first wire and a second wire,
wherein the first wire includes a first bent portion,
wherein the second wire includes a second bent portion,
wherein each of the first bent portion and the second bent portion is formed by two of the wire pieces,
wherein an angle of the first bent portion is different from an angle of the second bent portion,
wherein the first bent portion and the second bent portion are connected by a connecting portion extending a first direction,
wherein the first bent portion and the second bent portion are apart from each other in the first direction,
wherein the detection electrode further includes a third wire,
wherein the third wire includes a third bent portion formed by two of the wire pieces, an angle of which is different from at least one of the angle of the first bent portion and the angle of the second bent portion, and
wherein the first wire and the third wire are connected by the connecting portion.

12. The display device according to claim 11,
wherein the first bent portion is formed by a first wire piece and a second wire piece of the wire pieces,
wherein the second bent portion is formed by a third wire piece and a fourth wire piece of the wire pieces,
wherein the first wire piece of the first bent portion and the third wire piece of the second bent portion are connected by the connecting portion, and
wherein the second wire piece of the first bent portion and the fourth wire piece of the second bent portion are apart from each other in the first direction.

13. The display device according to claim 11,
wherein the first wire is arranged between the third wire and the second wire, and
wherein a distance between the first wire and the third wire is different from a distance between the first wire and the second wire.

14. The display device according to claim 11,
wherein the first wire includes a third bent portion formed by two of the wire pieces, an angle of which is different from at least one of the angle of the first bent portion and the angle of the second bent portion.

15. The display device according to claim 11,
wherein a second part of the wire pieces is not connected to the first wire, the second wire, and the connecting portion, and
wherein the second part of the wire pieces is arranged between the first wire and the second wire.

16. The display device according to claim 11,
wherein the display panel includes a plurality of pixels, and
wherein the maximum length of one pixel in a pixel orthogonal direction orthogonal to a pixel array direction on a plane parallel to a surface of the display panel is a first unit length,
wherein the maximum length of one pixel in the pixel array direction is a second unit length,
wherein the wire pieces extend in a direction inclined at an angle with respect to the pixel array direction, and
wherein a tangent value of the angle
is larger than a value obtained by dividing the value of the first unit length by a value twice as large as the second unit length,
is smaller than a value obtained by dividing a value twice as large as the first unit length by the value of the second unit length, and
is different from a value obtained by dividing the value of the first unit length by the value of the second unit length.

17. The display device according to claim 11,
wherein the display panel includes a plurality of pixels, and wherein the wire pieces extend in a direction inclined at an angle larger than 27 degrees and smaller than 45 degrees or at an angle larger than 45 degrees and smaller than 63 degrees with respect to a pixel array direction in which a color area having the highest human visibility among a plurality of color areas included in each of the pixels is aligned.

18. The display device according to claim 11, wherein a difference between the angle of the first bent portion and the angle of the second bent portion is less than 15 degrees.

19. A detection device comprising:

a detection electrode including wire pieces, the detection electrode including a first wire and a second wire, wherein the first wire includes a first bent portion, wherein the second wire includes a second bent portion, wherein each of the first bent portion and the second bent portion is formed by two of the wire pieces and includes a first edge and a second edge, wherein an angle of the first bent portion is different from an angle of the second bent portion, wherein the first edge of the first bent portion and the first edge of the second bent portion are connected by a connecting portion, wherein the second edge of the first bent portion and the second edge of the second bent portion are not connected each other, wherein the detection electrode further includes a third wire, wherein the third wire includes a third bent portion formed by two of the wire pieces, an angle of which is different from at least one of the angle of the first bent portion and the angle of the second bent portion, and wherein the first wire and the third wire are connected by the connecting portion.

\* \* \* \* \*